United States Patent
Ellis et al.

(10) Patent No.: US 11,346,903 B2
(45) Date of Patent: *May 31, 2022

(54) SENSOR ARRAY FOR READING A MAGNETIC PUF

(71) Applicant: Lexmark International, Inc., Lexington, KY (US)

(72) Inventors: James Howard Ellis, Lexington, KY (US); Keith Bryan Hardin, Lexington, KY (US); William Pohl Corbett, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,474

(22) Filed: Sep. 4, 2020

(65) Prior Publication Data

US 2020/0400762 A1 Dec. 24, 2020

Related U.S. Application Data

(63) Continuation-in-part of application No. 16/429,710, filed on Jun. 3, 2019, now Pat. No. 10,921,393.
(Continued)

(51) Int. Cl.
*H04L 9/32* (2006.01)
*G06K 7/08* (2006.01)
(Continued)

(52) U.S. Cl.
CPC ..... *G01R 33/1276* (2013.01); *G01R 33/0094* (2013.01); *G06K 7/082* (2013.01);
(Continued)

(58) Field of Classification Search
None
See application file for complete search history.

(56) References Cited

U.S. PATENT DOCUMENTS

| 9,608,634 | B1 | 3/2017 | Denton |
| 2004/0150385 | A1 | 8/2004 | Schroeder |

(Continued)

OTHER PUBLICATIONS

International Search Report; US patent application PCT/US20/49407; dated Mar. 11, 2021.

*Primary Examiner* — Kristy A Haupt

(57) ABSTRACT

A magnetic sensor array device is described that is constructed with multiple single sensor die, diced out of a wafer as a group and packaged in a wafer level package (WLP). The device comprises an array of multi-axis magnetic sensors that can measure the multi-dimensional magnetic field of an arbitrary sized two-dimensional region with high spatial resolution, reduced sensing distance, higher measurement throughput, tolerance to motion, improved temperature measurement, and improved yield when placed on a circuit card comprises part of an authentication system including a physical unclonable function ("PUF"), a substrate, a plurality of magnetized particles randomly dispersed in the substrate, and a PUF reader constructed using one or more of the magnetic sensor array devices wherein the PUF reader measures the magnetic field at multiple locations in close proximity to the magnetized particles. The measured magnetic field data may be compared to previously enrolled data to assess authenticity.

18 Claims, 18 Drawing Sheets

Related U.S. Application Data

(60) Provisional application No. 62/942,364, filed on Dec. 2, 2019, provisional application No. 62/896,883, filed on Sep. 6, 2019.

(51) Int. Cl.
  *G01R 33/00* (2006.01)
  *G01R 33/12* (2006.01)
  *G06V 40/13* (2022.01)

(52) U.S. Cl.
  CPC ............ *G06V 40/13* (2022.01); *H04L 9/3278* (2013.01); *H04L 2209/12* (2013.01)

(56) References Cited

U.S. PATENT DOCUMENTS

| | | |
|---|---|---|
| 2008/0160184 A1 | 7/2008 | Sato |
| 2011/0074406 A1 | 3/2011 | Mather |
| 2015/0329352 A1 | 11/2015 | Bowles |
| 2017/0030981 A1 | 2/2017 | Lynde |
| 2017/0104600 A1 | 4/2017 | Booth |
| 2017/0123016 A1* | 5/2017 | Deak .................. G01R 33/0011 |
| 2017/0242660 A1 | 8/2017 | Katoh |
| 2018/0284200 A1 | 10/2018 | Chen |
| 2019/0038178 A1* | 2/2019 | Sasaki .................. A61B 5/6873 |

* cited by examiner

FIG. 16

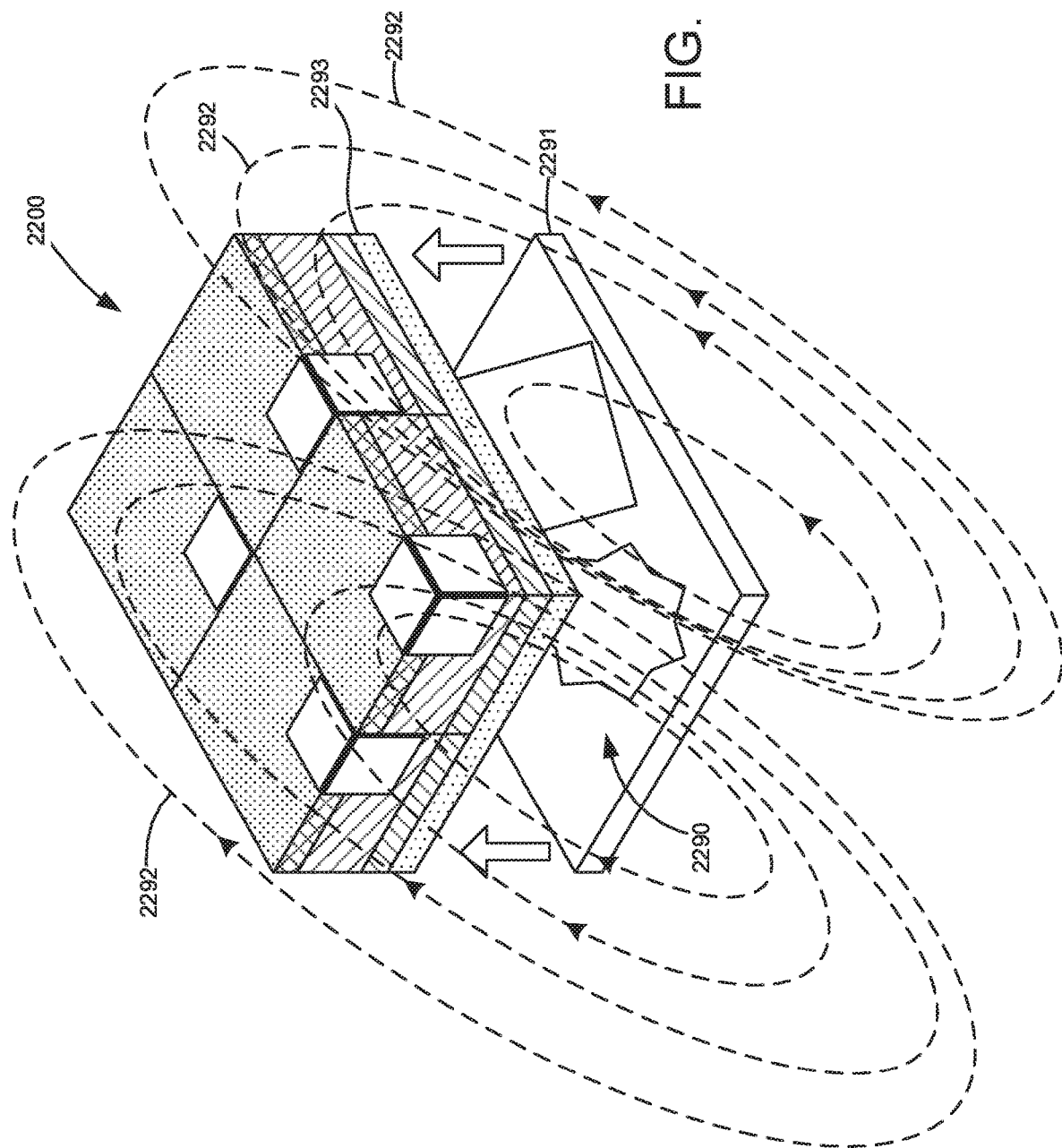

SENSOR ARRAY FOR READING A MAGNETIC PUF

CROSS REFERENCES TO RELATED APPLICATIONS

This application claims priority and benefit as a continuation-in-part application of U.S. patent application Ser. No. 16/429,710, titled "Magnetometer Chip Sensor Array for Reading a Magnetic PUF, Including a Magnetic PUF Film or Tape, and Systems Incorporating the Reader," having a filing date of Jun. 3, 2019. This application also claims priority and benefit under 35 U.S.C. 119(e) from U.S. provisional application Nos. 62/896,883 titled "Magnetic Sensor Array Device for Reading a Magnetic PUF," having a filing date of Sep. 6, 2019 and 62/942,364 titled "Magnetic Sensor Array Device for Reading a Magnetic PUF," having a filing date of Dec. 2, 2019.

BACKGROUND

1. Field of the Invention

This invention relates generally to sensor arrays for measuring magnetic fields in a PUF fingerprint, and more particularly, to a PUF reader device that incorporates the sensor arrays.

2. Description of the Related Art

U.S. Pat. No. 9,553,582, incorporated herein by reference, discloses a PUF (Physical Unclonable Function) that contains magnetic particles, which generate a complex magnetic field near the surface of the PUF part. This magnetic field may be measured along a path and data corresponding to the magnetic field components recorded for later comparison and authentication of the PUF part. U.S. Pat. No. 9,608,828, incorporated herein by reference, discloses the advantages of magnetizing the feed stock prior to the injection molding process to achieve a random orientation of the magnetization directions. In these patents, flakes of an NdFeB alloy are cited as the preferred magnetic particles, however other magnetic materials, alloys, and particle shapes may be employed. These flakes are typically about 35 microns thick with irregular shapes varying in width from 100-500 microns but may vary substantially from these ranges. The NdFeB alloy is not easily magnetized because it has an intrinsic coercivity of around 9,000 Oersted. However, once magnetized, the alloy has a residual induction of about 9,000 gauss, and the random locations and magnetic orientations of the particles and flakes produce sharp peaks in the magnetic field strength of about $\pm 10$-35 gauss when measured at a distance of about 0.5 mm from the surface of the PUF.

The magnetic PUF technology can be applied to create PUF tags for authenticating passports, secure ID cards, and other non-rotating objects. For these applications, the complex magnetic field structure near the surface of a magnetic PUF, measured over a non-rotating 2-dimensional region can serve as a magnetic "fingerprint." A low cost means of authenticating the magnetic PUF fingerprint is needed for non-rotating systems that read stationary or translating PUFs. In a rotating PUF sensor system a single sensor can measure the magnetic profile values at multiple angles around a circular path through the PUF fingerprint. This is possible using a single 3-axis Hall effect sensor because the rotation of the PUF element enables the fingerprint to be sampled at a high spatial frequency using a single magnetometer chip. For non-rotating PUF systems with no moving parts, the sampling of the magnetic fingerprint at multiple locations requires multiple magnetic field sensors, or movement of the PUF with respect to the sensors (similar to a credit-card swipe). A resolution of at least 0.1 gauss is preferred given the expected signal amplitudes generated by PUF samples.

SUMMARY OF THE INVENTION

The problem of counterfeit goods is rapidly escalating and affecting many markets and geographies that include not only retail products purchased by unwary consumers, but also products that are important to public safety, and national security. One recent study projected the annual economic impact of global counterfeiting to be over $1T across a broad class of industry segments at more than 2% of the total global economic output. Beyond an economic impact, counterfeiting is posing a risk to public safety with fake products showing up in pharmaceuticals (e.g., prescription drugs), medical equipment (e.g., surgical drills), food products (e.g., baby formula), cosmetics (e.g., make up), liquor (e.g., bourbon) and automotive equipment (eg air bag control unit). Spare parts used in public transportation systems (e.g., planes and trains) are also subject to counterfeiting where failure can have life threatening consequences.

Counterfeiting is also now a major threat to many systems that protect national security. The rise in the recycling of electronic components has increased the likelihood that components that are defective, substandard or unauthorized copies will make their way into the supply chain and impact critical military systems used for national defense (e.g., aircraft, weapons). Important government identification documents used to protect the borders from illegal access (e.g., passports) are also at risk of counterfeiting and there is evidence that counterfeit goods are also a means of supplying cash to terrorist organizations who threaten individuals and nations.

All these counterfeiting threats call for improved methods to identify and eliminate counterfeit products from making their way into the supply chain and impacting the life of individuals or nations in these negative ways. Unique physical objects that contain high entropy from random stochastic manufacturing processes, making them nearly impossible to copy, offer an improved alternative to authentication methods based on cryptographic algorithms often using integrated circuits that can easily be copied. Such a unique physical object (also referred to as Physical Unclonable Function or PUF) can be based on any random occurring property in physical realm such as electrical, optical or magnetic. When a unique physical object is combined with a high-resolution sensing system capable of extracting all the entropy from the object and a secure storage repository to hold the entropy data sensed from the object (for later us in authenticating the object) it can form the basis of a new authentication system offering improved security.

Such a new authentication system is disclosed in U.S. Pat. No. 9,553,582, one that is based on a unique physical object, where the unique physical object is a PUF (Physical Unclonable Function) that contains magnetic particles that are random in size, shape and orientation, which when magnetized generate a complex and random (in amplitude and direction) magnetic field near the surface of the PUF part. This magnetic field may be measured along a path and the data corresponding to the magnetic field components recorded for later comparison and authentication of the PUF part. U.S. Pat. No. 9,608,828, discloses the advantages of magnetizing the feed stock prior to the injection molding process to achieve a random orientation of the magnetization directions.

In these patents, flakes of an NdFeB alloy are cited as the preferred magnetic particles, however other magnetic materials, alloys, and particle shapes may be employed. These magnetic particles have a diameter greater than 25 µm and have an average diameter from 50-500 µm and an average thickness less than the diameter. The magnetic field from the surface of the PUF is generated by the magnetized NdFeB alloy that once magnetized has a residual induction of about 9,000 gauss, and the random locations and magnetic orientations of the particles and flakes produce sharp peaks in the magnetic field strength of +/−10-35 gauss when measured with a magnetic sensor at a distance of about 0.5 mm from the surface of the PUF. When measured with a magnetic sensor from a distance less than 0.5 mm from the PUF part, the magnetic field strength increases to greater than +/−35 gauss. The non-homogeneous magnetic field on the surface of the PUF part is random in amplitude and direction and may change substantially across the surface of the PUF part at distances less than 500 µm and can make complete peak to peak changes at distances less than 1 mm.

A unique physical object PUF part that is constructed with these characteristics produces a magnetic field across its surface which can be sensed with a reader device such as that disclosed above. This system discloses a magnetometer chip sensor array that provides a two-dimensional sensing system capable of measuring the complex magnetic field structure near the surface of a magnetic PUF over a non-rotating 2-dimensional region.

As shown in FIG. 1, the Z-component (normal to a PUF surface) of a representative magnetic PUF fingerprint does not change significantly over 0.1-0.2 mm of travel along the surface of the PUF. This is because the Hall-effect sensor or sensing element in this example is about 0.5-1.0 mm above the magnetized flakes generating the magnetic field. An economical array of Hall-effect sensors for sampling and validating the magnetic fingerprint would have the sensors nominally spaced approximately at least 0.4 mm apart for the flake sizes discussed in the related art. The average flake length for this approximation is 0.3 mm. The ratio of the minimum separation to particle length is approximately 1.33.

A low cost PUF fingerprint reader can be constructed using multiple discrete 3-axis magnetometer chips. A 1.46 mm×1.46 mm wafer level chip size package, for example, could be placed on a circuit card with a 2 mm center-to-center spacing. This will enable the placement of a 5×5 array of 3-axis Hall-effect sensors within a 10 mm×10 mm window in this example, which would result in the sensing locations spanning an 8 mm×8 mm window for such an arrangement.

The random 3-axis magnetic field sensed from a two-dimensional region from a non-rotating PUF part can serve as the magnetic "fingerprint" for this authentication system.

In some applications it is desirable to manufacture the PUF tags to be as small as possible in order to reduce the cost of the tag, but to do so without decreasing the security provided by the random magnetic field characteristics of the unique physical object. In this case, magnetic particle sizes at the lower end of the range (25 µm minimum diameter and 50-500 µm average diameter) may be used which may produce a magnetic field amplitude at the lower end of the +/−10-35 gauss range when measured with a magnetic sensor 0.5 mm from the surface of the PUF part. In such a system, to avoid any loss of magnetic field data from the reduced dimensions, it is necessary to increase the two-dimensional spatial resolution of the sensor array to the range of the particle diameters (25-500 µm inclusive). Furthermore, since the magnetic field strength decreases inversely with the cube of the distance, it is important to reduce the distance of the sensor array to the surface of the PUF part to less than 0.5 mm in order to amplify the magnetic field strength generated by the small particles at the lower end of the +/−10-35 gauss range.

In yet other applications, it is desirable to manufacture the PUF tag to be a large as possible to maximize security of the system by providing more random data from a larger magnetic "fingerprint." In this case, magnetic particles could range from 25 µm minimum diameter to 50-500 µm average diameter and generate a magnetic field from +/−10-35 gauss range when measured with a magnetic sensor 0.5 mm from the surface of the PUF part. To measure a PUF part with a non-homogeneous magnetic field such as this with the highest accuracy (to reduce false positive and false negatives necessary for the highest security,) it is necessary to increase the two-dimensional spatial resolution of the sensor array to the range of particle diameters (25-500 µm inclusive). Further, in order to measure large PUF tags (e.g., greater than 1 mm×1 mm), with the highest accuracy, it is necessary to use a sensor array that has a large field of view that can measure the entire surface of the PUF part at one time (without moving the sensor in relation to the PUF part), that has a means to calibrate out any sensor to sensor variation across the sensor array, and that has a means to reduce measurement distortion caused by movement of the sensor in relation to the PUF part while the measurement is being made.

This invention discloses methods that improve the measurement accuracy, resolution and throughput of magnetic sensor arrays when used to measure the magnetic field across a surface of two-dimension PUF part. The multi-axis magnetic field data from these improved measurements can be combined with a verification algorithm such as a Pearson Correlation Function (or similar pattern recognition algorithm) to enable higher reliability identification of genuine and non-genuine PUFs, thus increasing the security of the system in terms of false positive and false negatives for arbitrary small and arbitrary large two-dimensional PUF's.

BRIEF DESCRIPTION OF THE DRAWINGS

Figure 1:
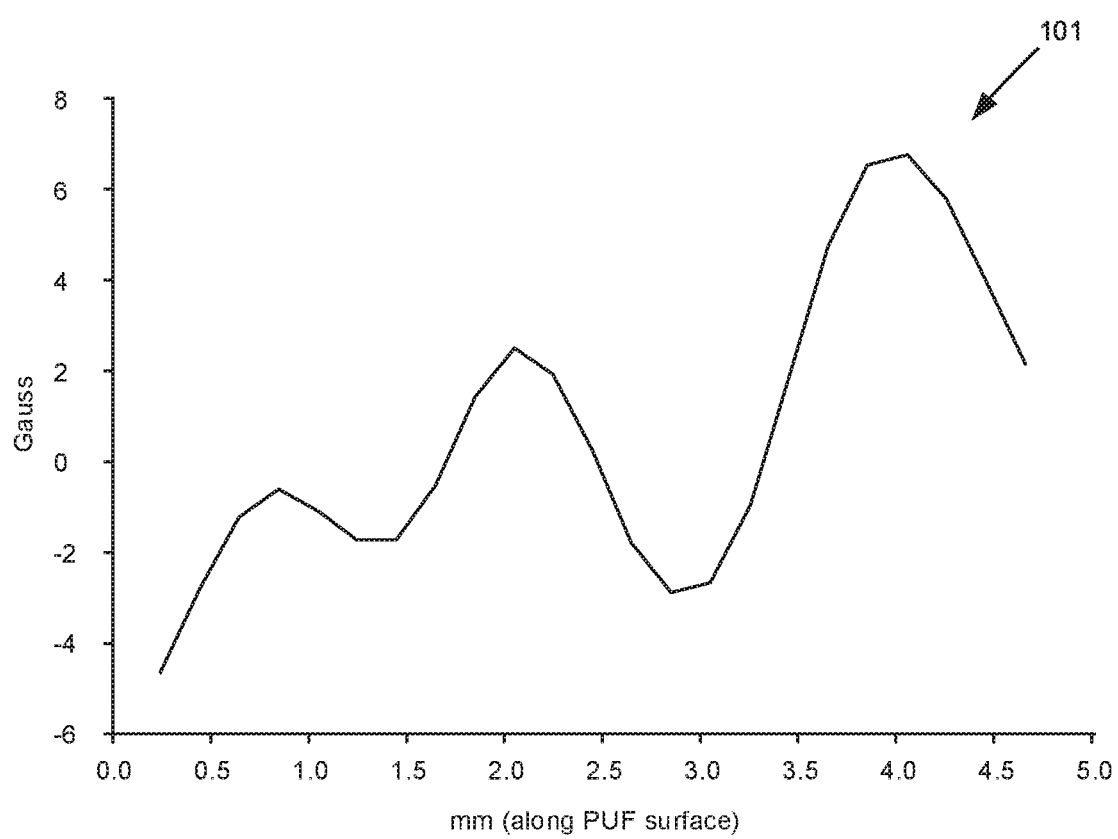

Having thus described the invention in general terms, reference will now be made to the accompanying drawings, which are not necessarily drawn to scale, and wherein:

FIG. 1 shows the Z-component of a representative magnetic PUF fingerprint.

Figure 2:
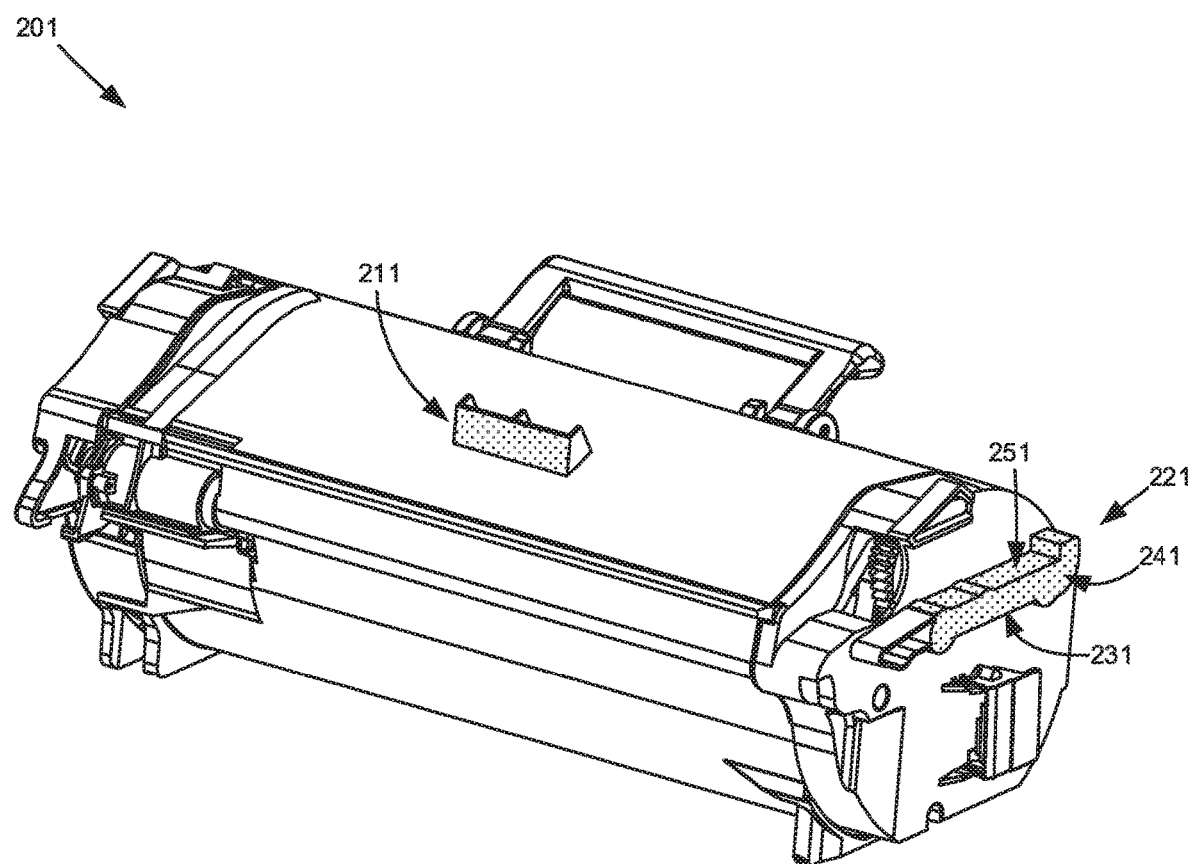

FIG. 2 shows a printer cartridge with PUF material attached.

Figure 3:
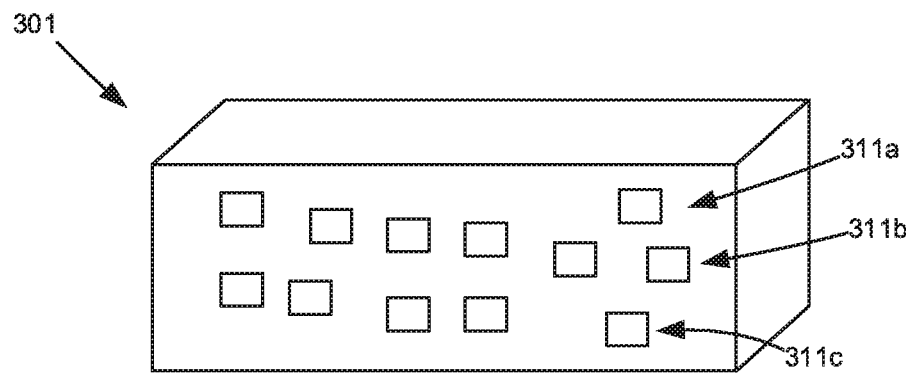

FIG. 3 shows a reader device with a sensor array.

Figure 4:
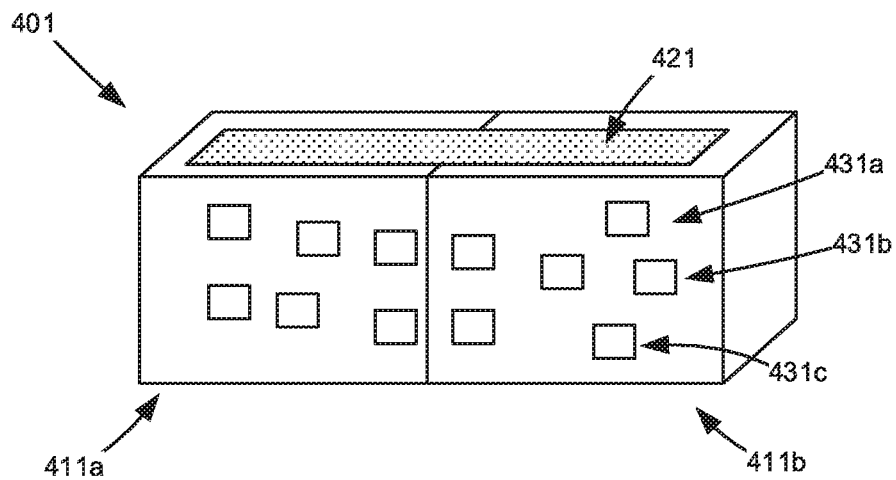

FIG. 4 shows a reader element that has two sections.

Figure 5:
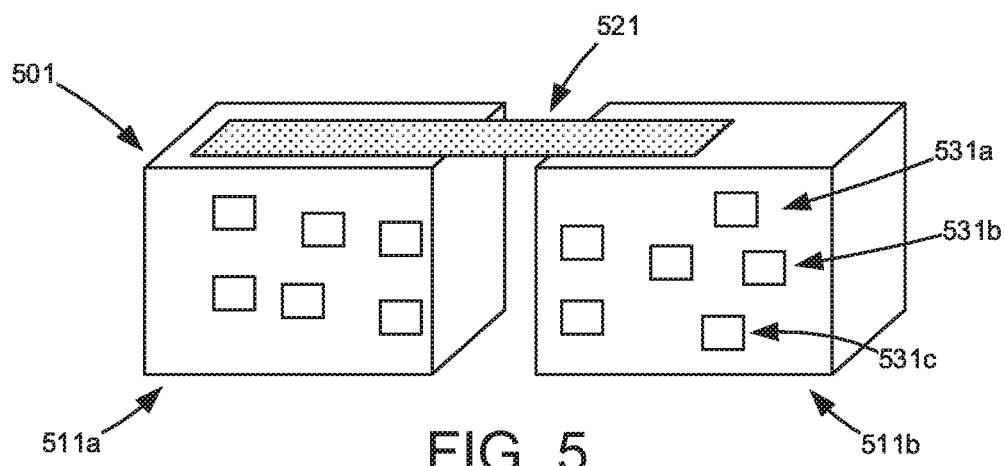

FIG. 5 shows a reader with two separated sections.

Figure 6:
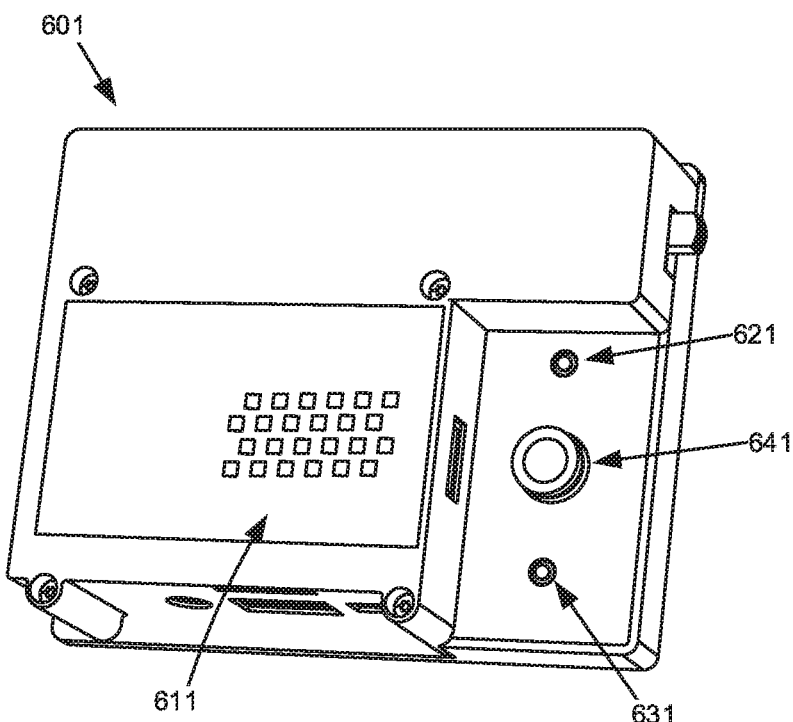

FIG. 6 shows a bottom isometric view of a PUF reader device.

Figure 7:
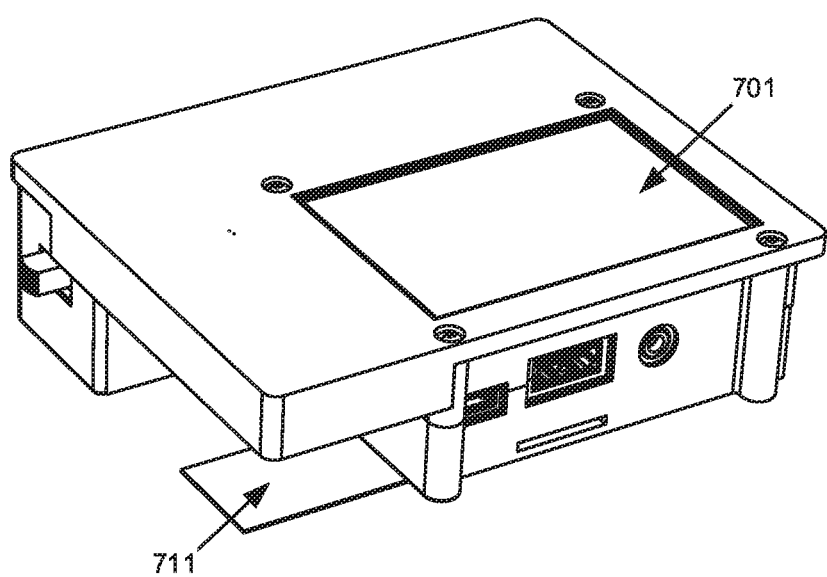

FIG. 7 shows a top isometric view of a PUF reader device adjacent to a PUF.

Figure 8:
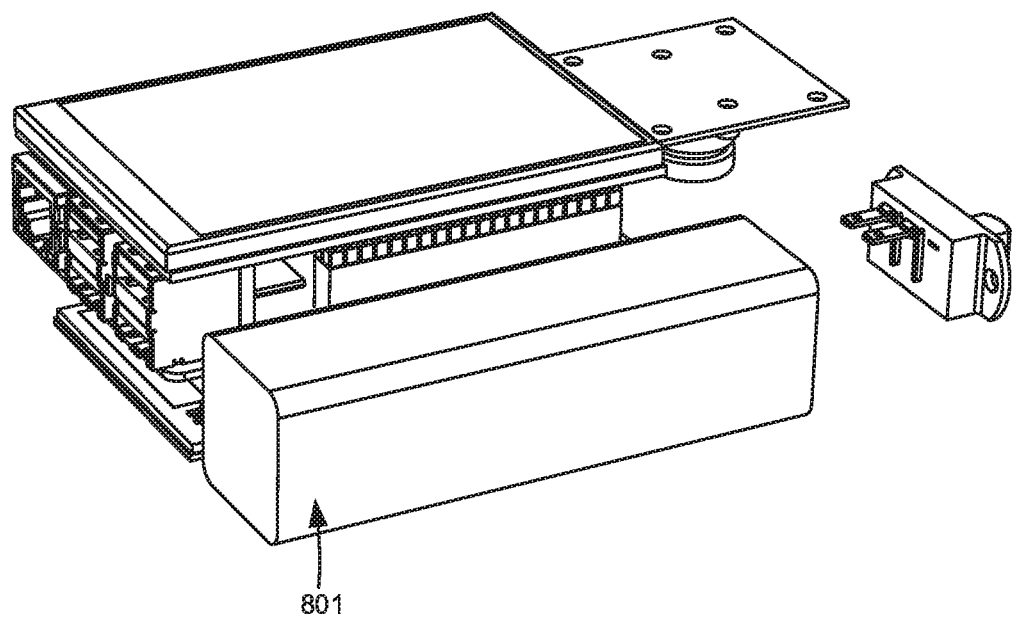
Figure 9:
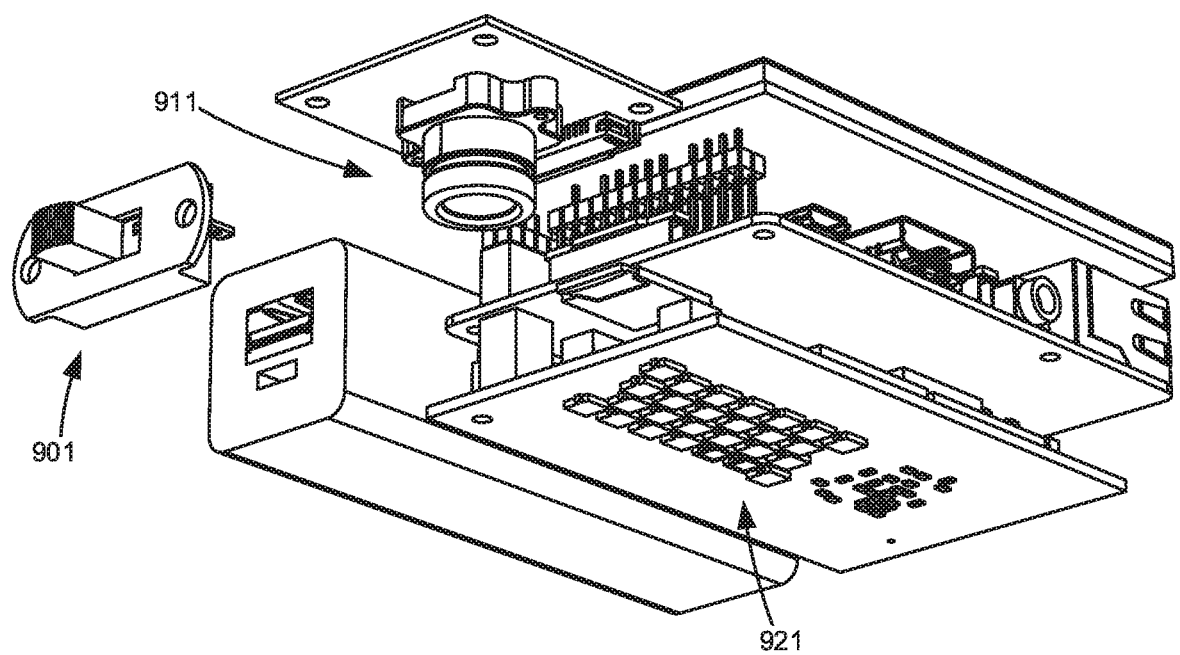

FIGS. 8 and 9 show exploded views of a PUF reader device.

Figure 10:
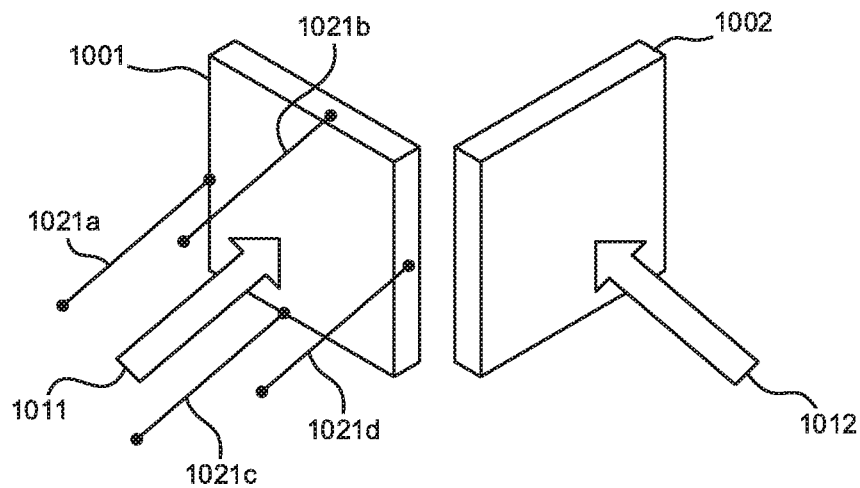

FIG. 10 shows a two-axis magnetic sensor.

Figure 11:
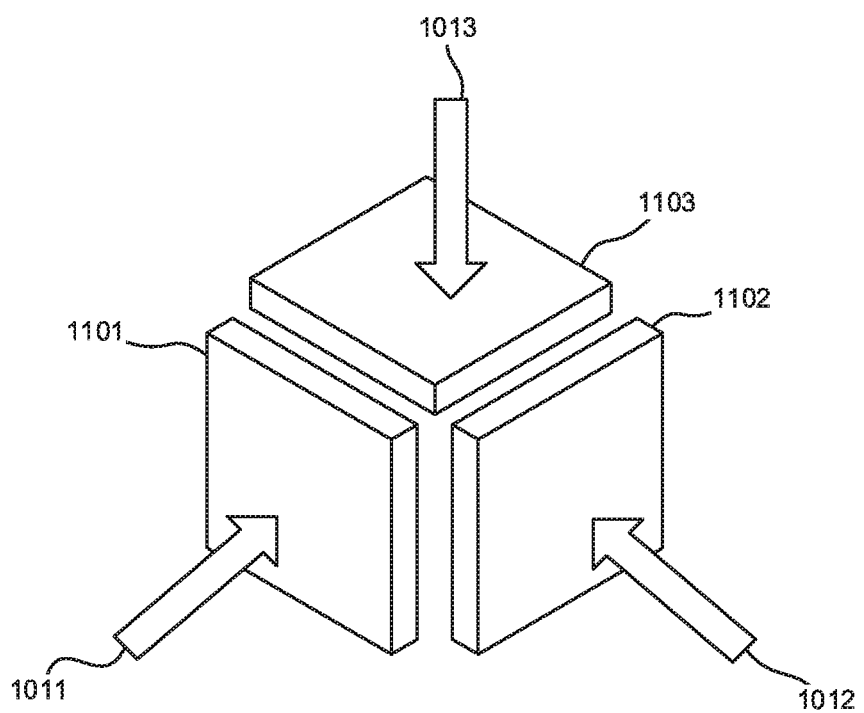

FIG. 11 shows a three-axis magnetic sensor.

Figure 12:
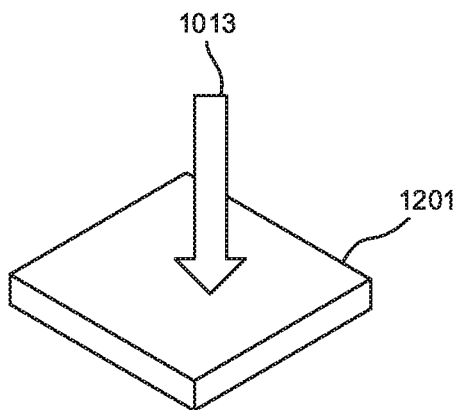

FIG. 12 shows the prior art one-axis magnetic sensor.

Figure 13:
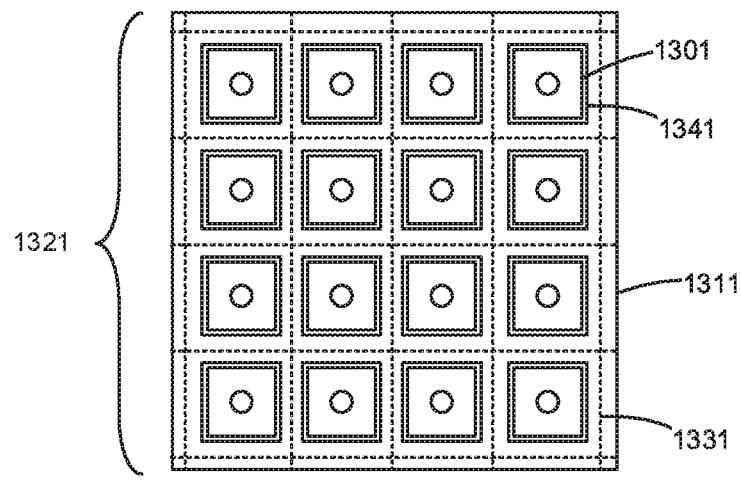

FIG. 13 shows a magnetic sensor array device which consists of multiple magnetic sensor die that are sawn out of the wafer individually and assembled together in an integrated circuit package.

Figure 14:
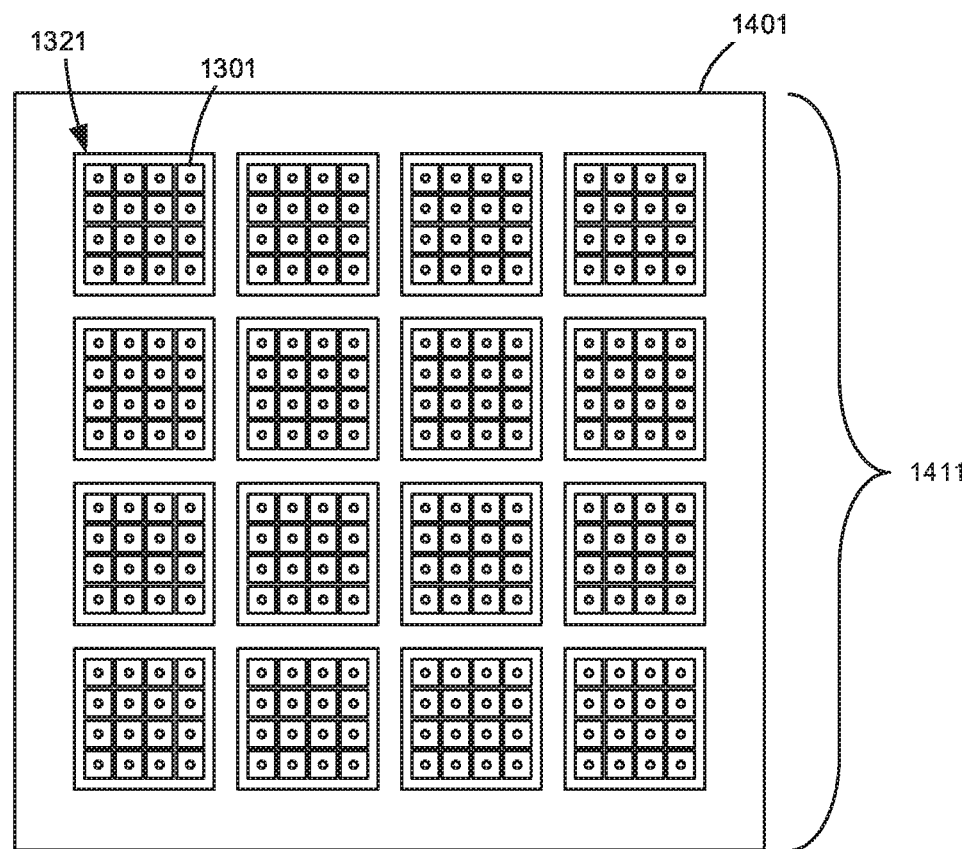

FIG. 14 shows one or more of the magnetic sensor array devices assembled on a printed circuit card.

Figure 15:
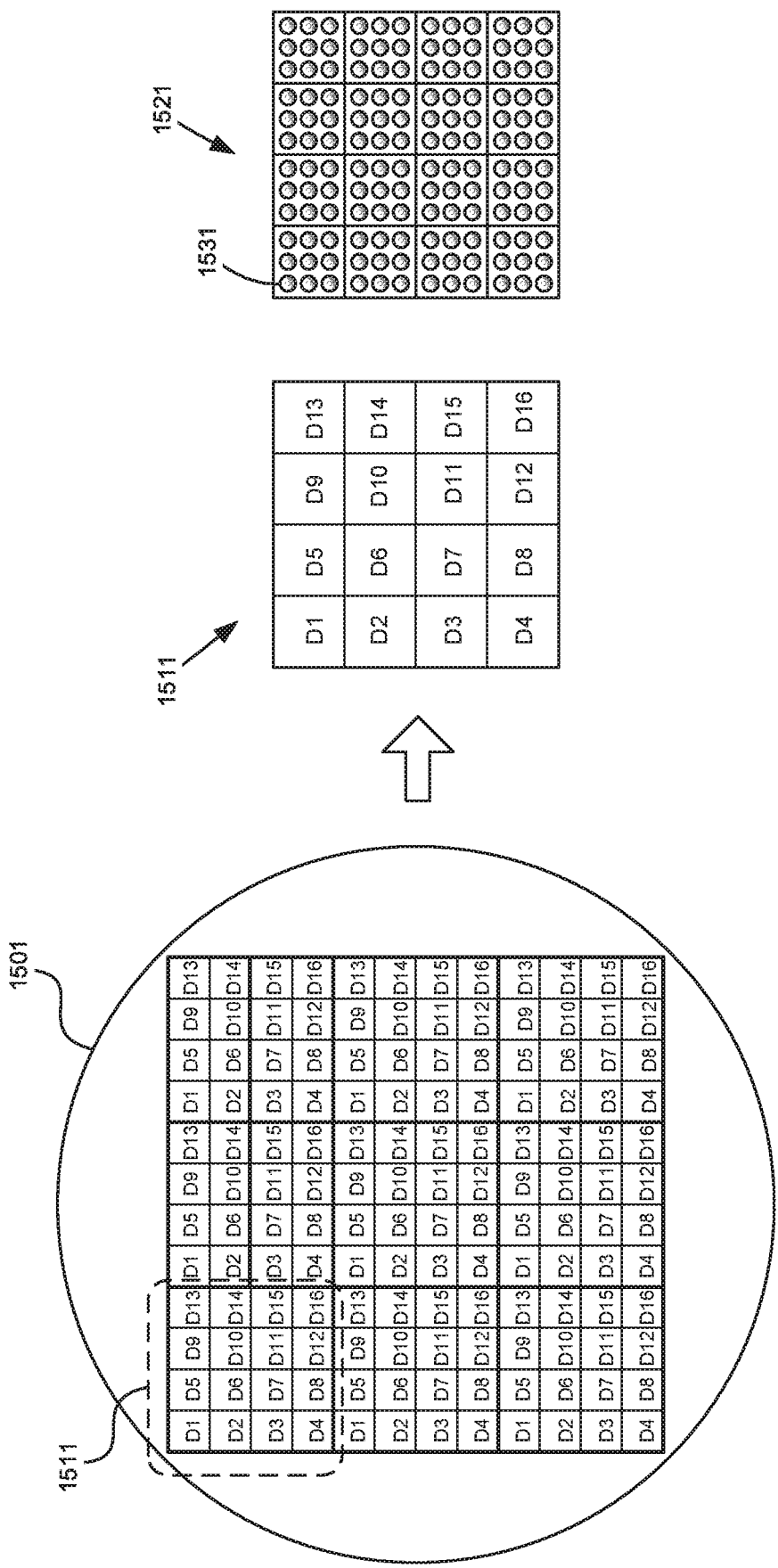

FIG. 15 shows a magnetic sensor array device which consists of multiple magnetic sensor die that are sawn out of the wafer as a group and assembled as a unit in an integrated circuit package.

Figure 16:
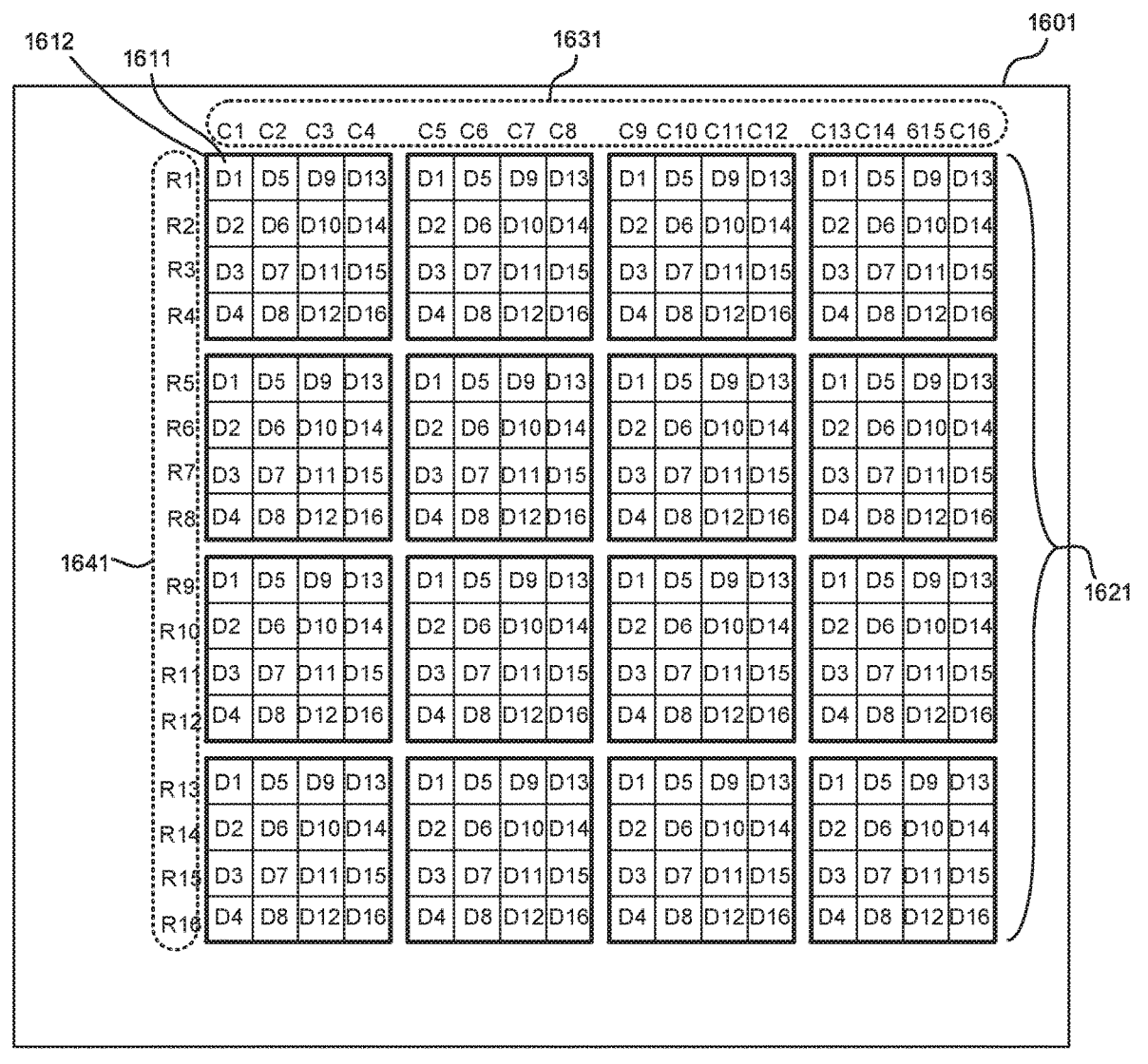

FIG. 16 shows magnetic sensor array devices assembled on a printed circuit card.

Figure 17:
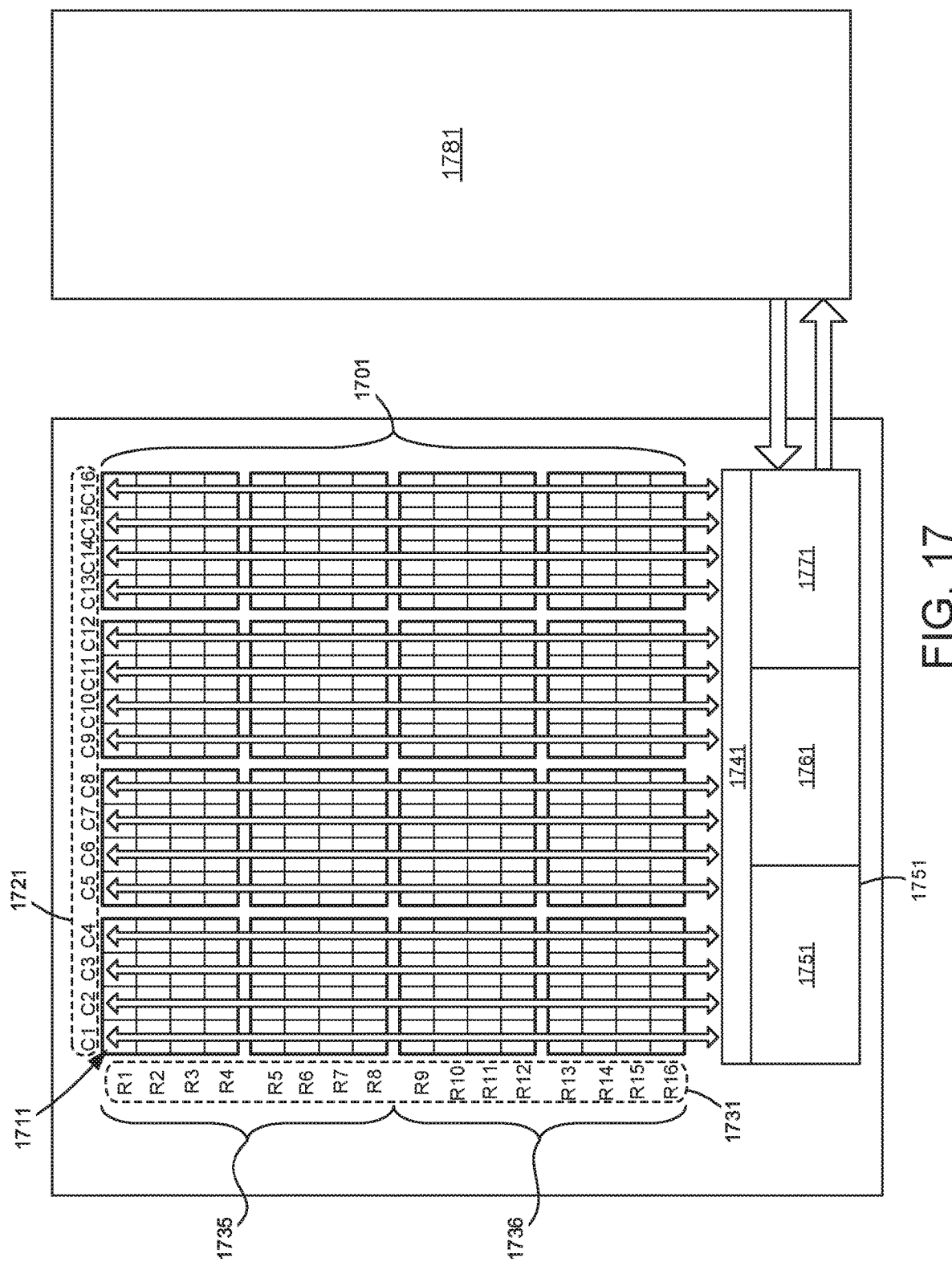

FIG. 17 shows a measurement system with sixteen magnetic sensor array devices forming a two-dimensional magnetic sensor array.

Figure 18:
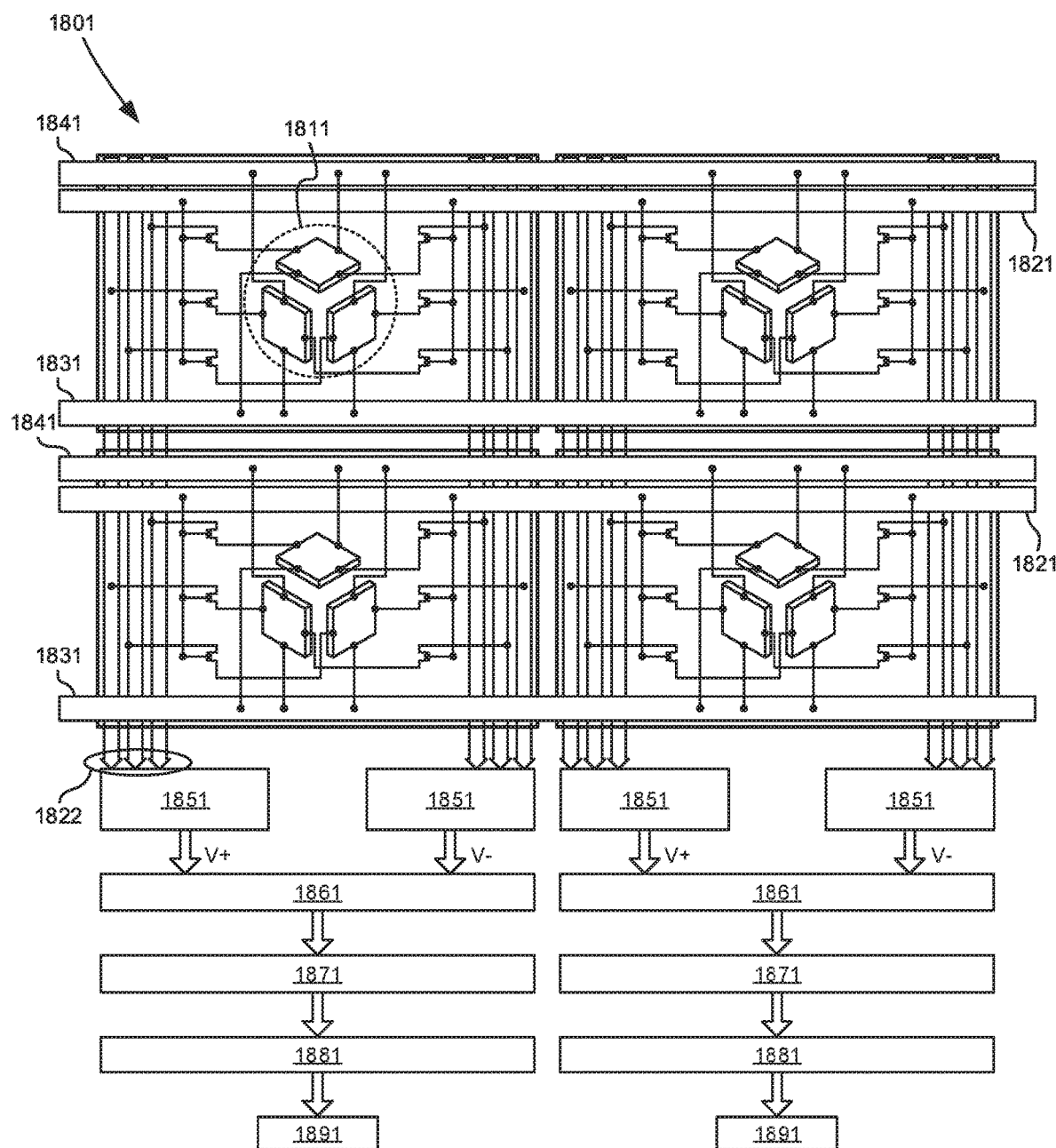

FIG. 18 shows the organization of a magnetic sensor array device where multiple multi-axis magnetic sensors are arranged in a two-dimensional array on a common semiconductor substrate.

Figure 19:
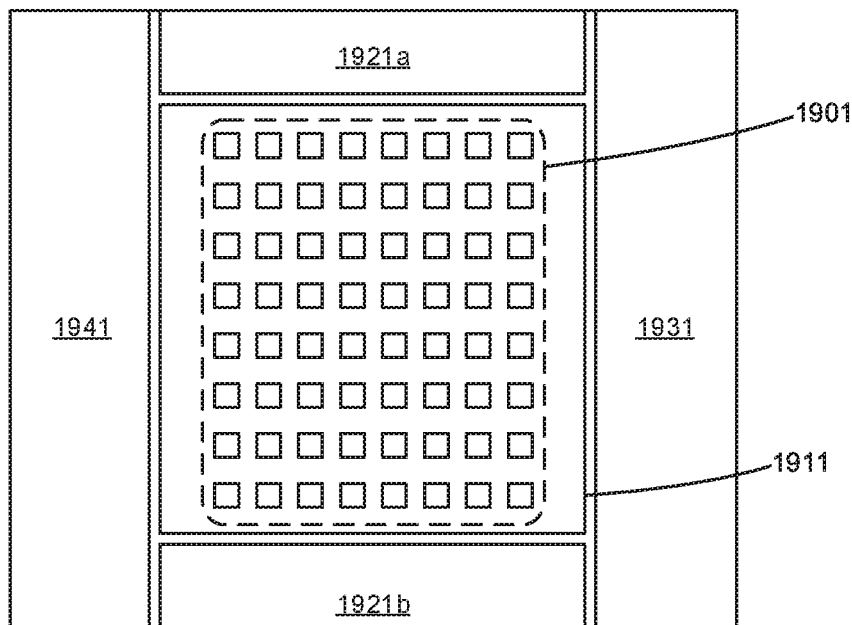

FIG. 19 shows the features of a monolithic multi-axis magnetic sensor array constructed on a semiconductor substrate.

Figure 20:
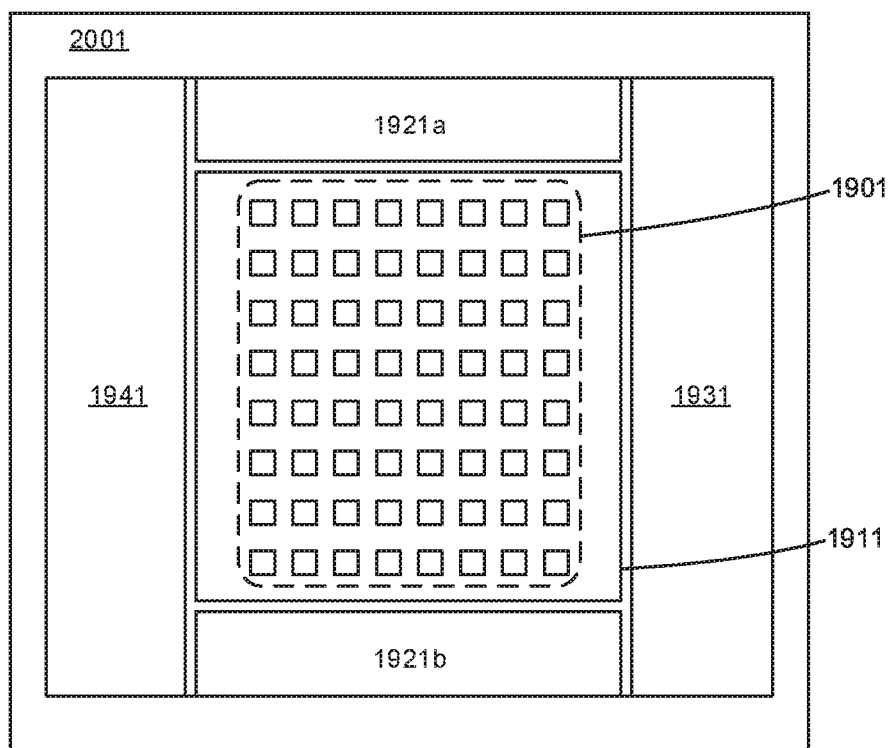

FIG. 20 shows the device of FIG. 19 placed on a printed circuit card.

Figure 21:
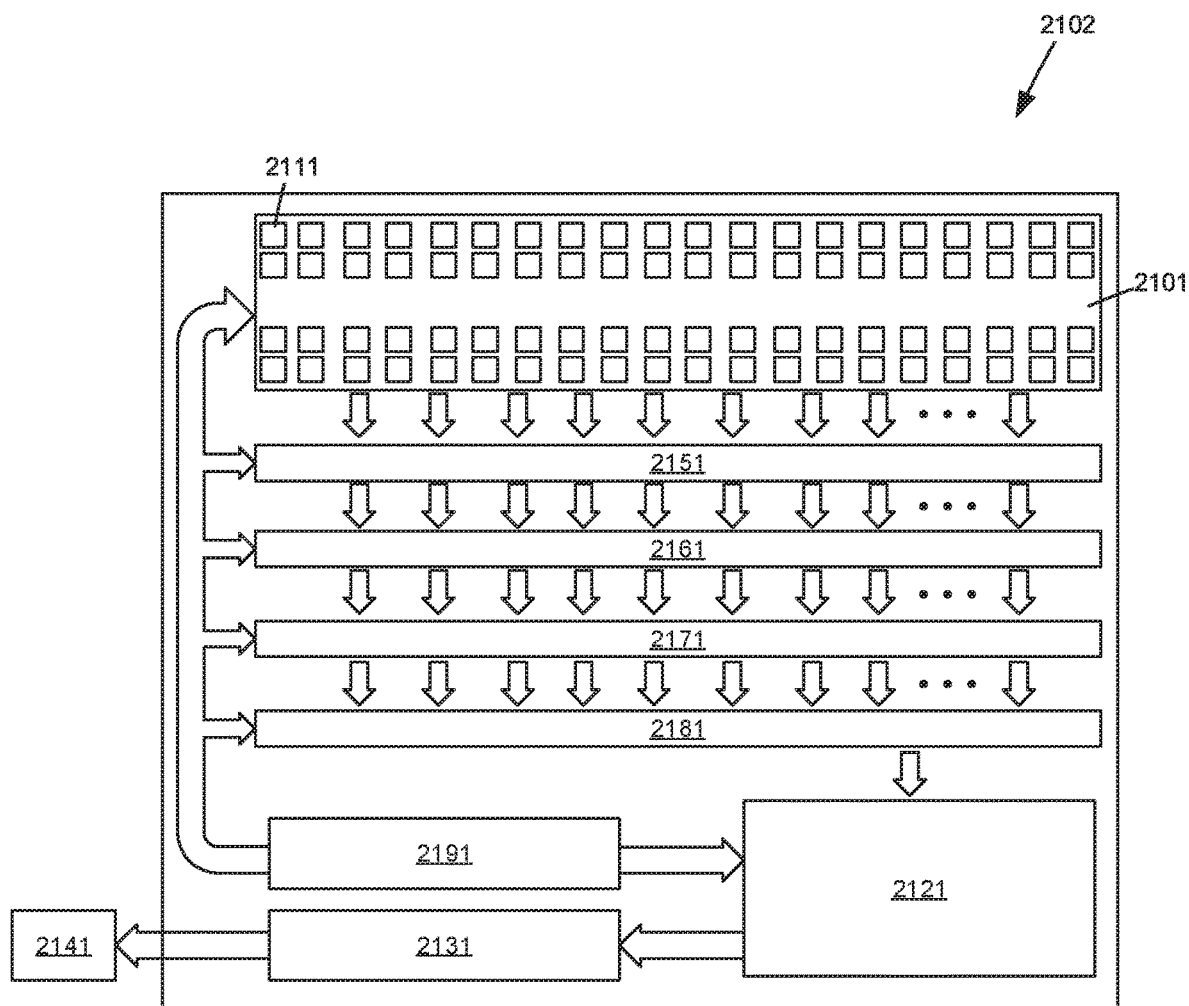

FIG. 21 shows a monolithic magnetic sensor array.

Figure 22B:
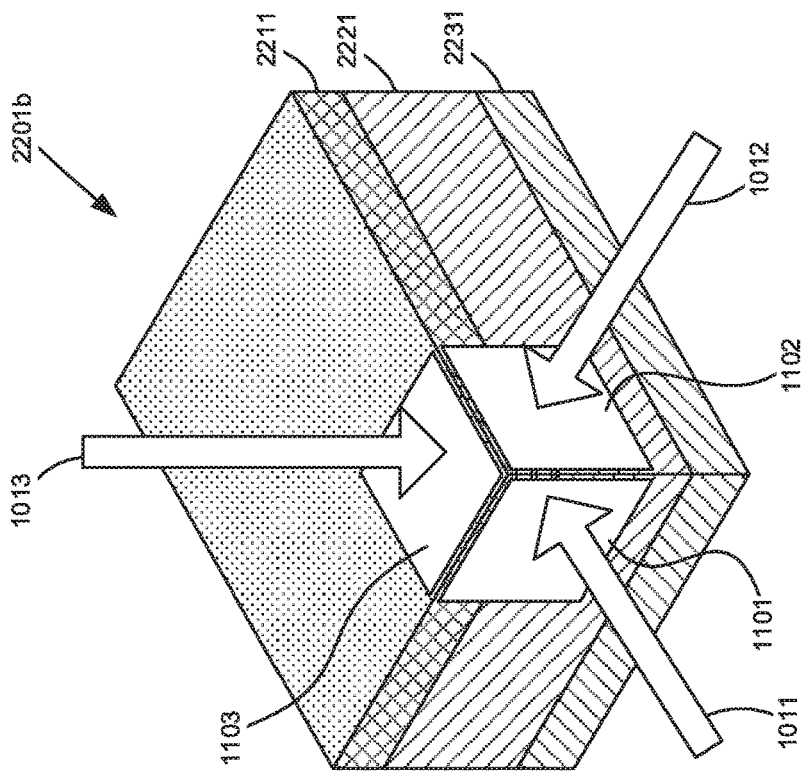
Figure 22A:
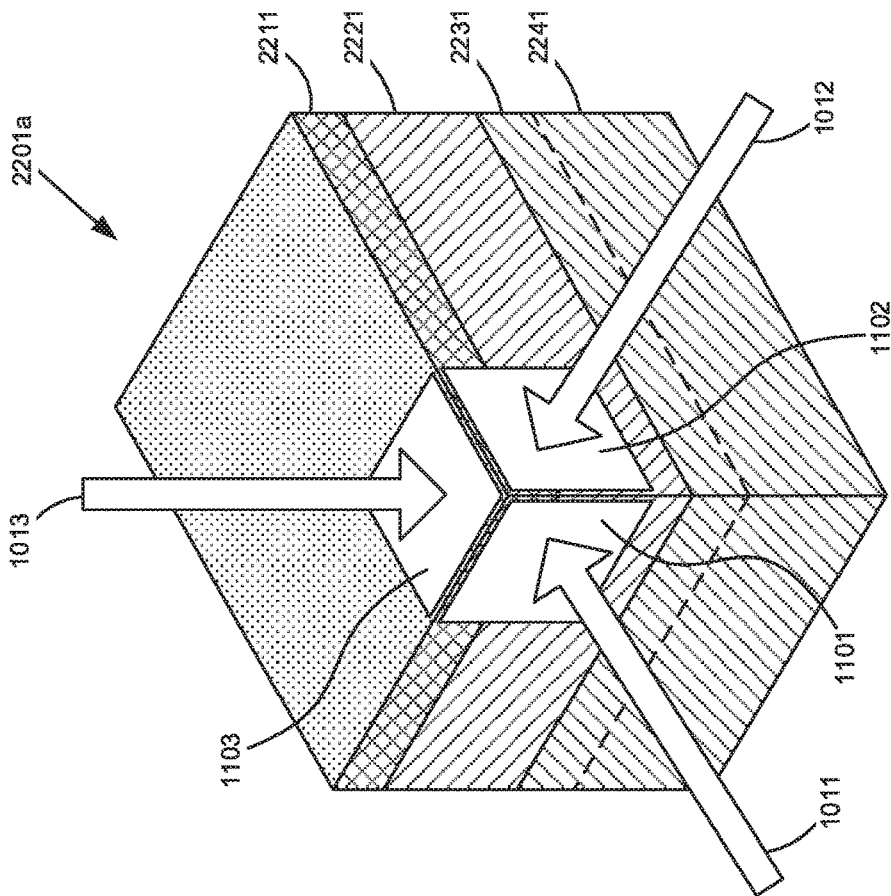

FIGS. 22A, 22B, and 22C shows a construction process to reduce the distance of the magnetic sensor array to a PUF part.

Figure 23:
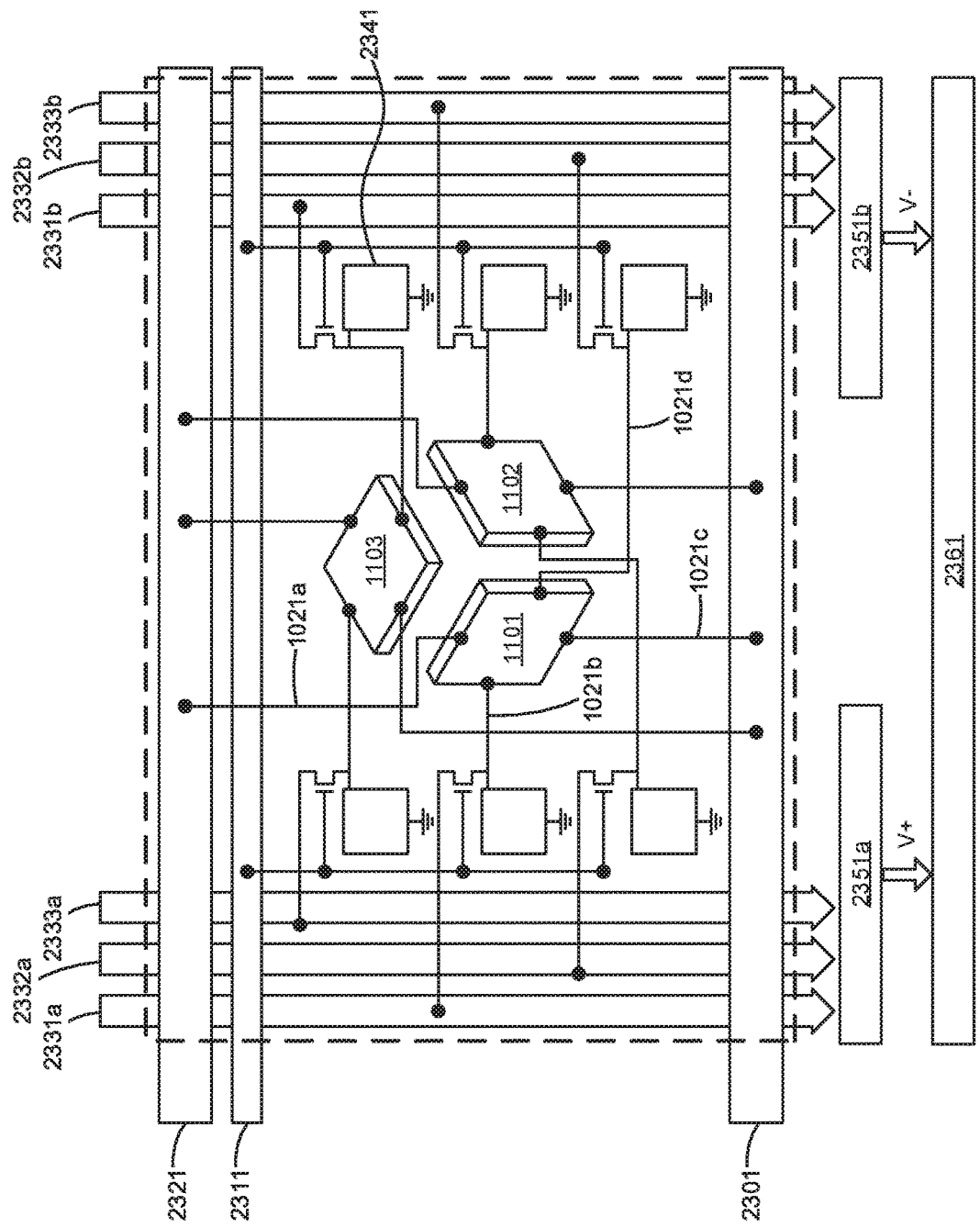

FIG. 23 shows a sample and hold circuit that is integrated into each axis of a magnetic sensor and is replicated for each magnetic sensor in the two-dimensional array.

Figure 24A:
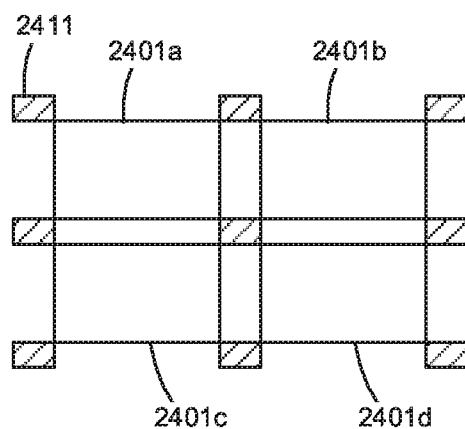
Figure 24B:
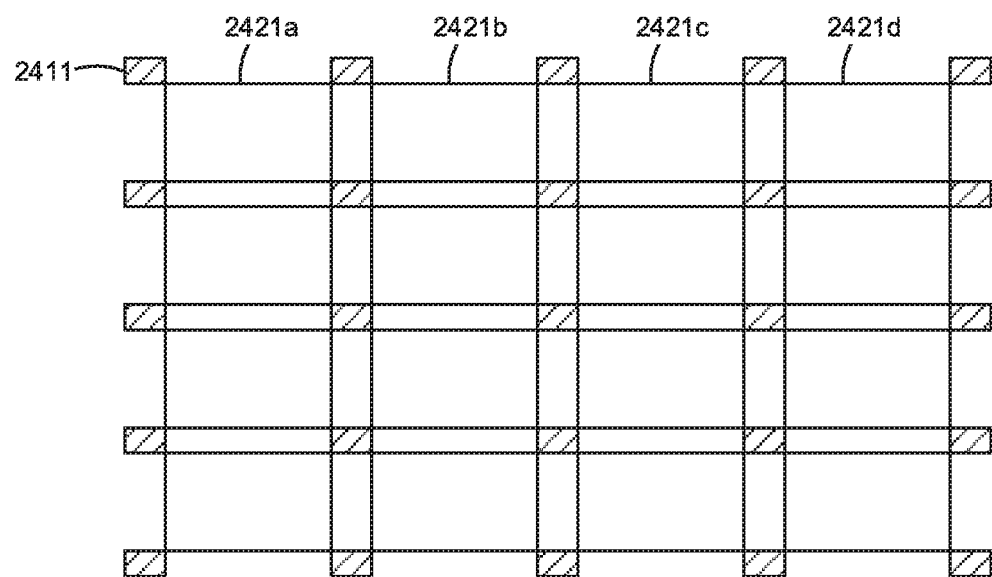

FIGS. 24A and 24B shows a magnetic sensor array divided into four and sixteen sections with a temperature sensor placed at the corner of each section.

Figure 25:
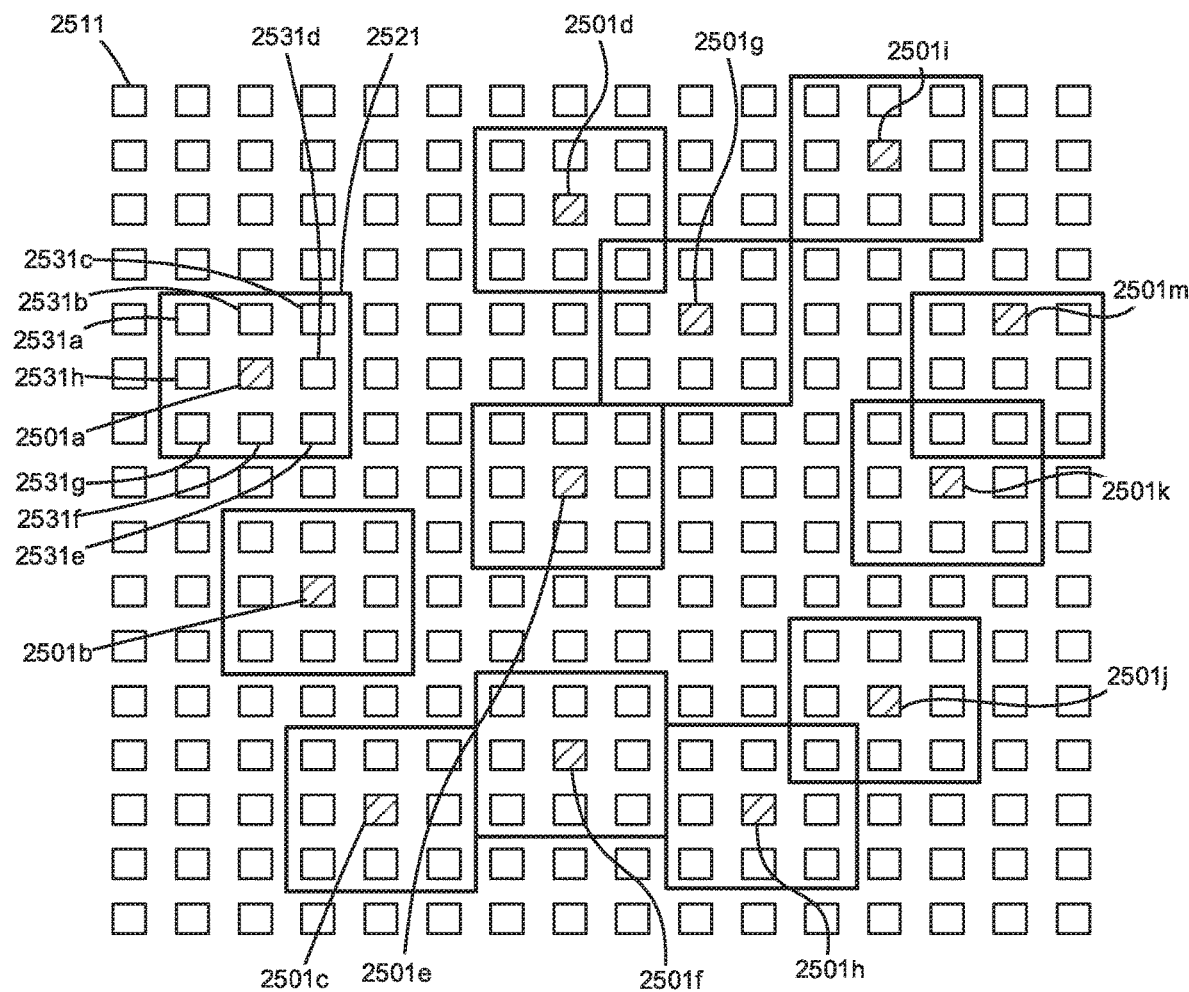

FIG. 25 shows a fraction of non-functional magnetic sensors distributed over a magnetic sensor array.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology, terminology and dimensions used herein is for the purpose of description and should not be regarded as limiting. As used herein, the terms "having," "containing," "including," "comprising," and the like are open ended terms that indicate the presence of stated elements or features, but do not preclude additional elements or features. The articles "a," "an," and "the" are intended to include the plural as well as the singular, unless the context clearly indicates otherwise. The use of "including," "comprising," or "having" and variations thereof herein is meant to encompass the items listed thereafter and equivalents thereof as well as additional items. Terms such as "about" and the like are used to describe various characteristics of an object, and such terms have their ordinary and customary meaning to persons of ordinary skill in the pertinent art. The dimensions of the magnetic particles, separations between particles and sensor locations are interrelated and can be proportionally scaled with respect to each other to provide different dimensional solutions.

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numerals refer to like elements throughout the views.

One of the challenges of using multiple sensor chips is the manufacturing tolerances on the exact physical locations of the Hall effect sensor elements within the assembled PUF read head. The chip packages can typically be placed with ±0.05 mm accuracy. Further, the sensing elements have ±0.05 mm tolerances within the chip packages for each dimension. Therefore, the uncertainty in the relative measurement location of a given sensor is ±0.1 mm. Uncertainty of the relative x and y spacings can be reduced by x-raying the chip array to measure the sensor element positions in X-Y coordinate directions. A less expensive method would be to use a calibration fixture to accurately scan a PUF object over an X-Y coordinate window that is larger than the nominal distance (center-to-center) between the sensor chips. The overlapping data from adjacent sensors can be used to determine the relative locations of the sensor elements.

A computer simulation was conducted to investigate how many sensors are required in an array to achieve a desire confidence level that the test result is not a false positive. In the simulations, the fingerprint enrollment data was recorded over the PUF surface at 0.1 mm intervals in both the X and Y coordinate directions. Further, the height Z of each sensor chip varies randomly ±0.05 mm. When a PUF read head array is brought into contact with an enrolled PUF tag to measure its fingerprint, the location of the validation sensor array is assumed to be aligned with the enrollment data window within ±1 mm. A correlation algorithm testing the simulated validation readings against the enrollment fingerprint map by calculating the Pearson correlation R-value for each component of the magnetic field and multiplying the components together, i.e., $R_{xyz}=R_x*R_y*R_z$. This correlation is preferred for multiple array locations within the fingerprint enrollment data. Any other suitable statistical analysis could be used to compare the validation readings to the enrollment values.

Typically, when the magnetic sensors are more than 1 mm apart, the magnetic field values at each sensor location essentially becomes independent variables. If only one sensor is used to authenticate the magnetic field, the probability is high that a match to that sensor's magnetic field readings can be found along the X and Y coordinate dimensions in the enrollment data. With multiple magnetic sensors separated by known distances along the X and Y coordinate dimensions, the probability of finding a false positive match is reduced. If the probability were to be only reduced to 0.01, then a counterfeiter could produce hundreds of PUF parts and test the set to collect the ones that happened to be accepted by the validation algorithm. A much lower probability of a false positive outcome is needed to make this counterfeit strategy cost prohibitive.

To assess the probability of a counterfeiter producing a random match, hundreds of simulations were run for magnetic PUF readers using 4, 5, 6, 7, 8, 12, 16, 20, and 24 magnetic sensors (3-axis) to generate estimates of the probability of a random match (a false positive). In these simulations the magnetic sensors were nominally spaced 2 mm apart. Statistical analysis of the hundreds of validation scores showed that an array of 4 sensors (3-axis) would produce a passing test result about 8.20E-02, i.e., 8.20% of the time. This arrangement does not provide a high confidence level that the "passed" item is authentic. Increasing the number of sensor locations to 5 would produce a false positive about 4.20% of the time. Table 1 shows the probability of generating validation scores above 0.7 using the Pearson correlation R-value, $R_{XYZ}$, when testing random PUF parts. Analysis of the log of the probabilities confirms that it is a linear function of the number of sensors.

One approach to decreasing a random match without increasing the number of sensors is if the PUF reader measures the fingerprint, moves at least 0.5 mm and takes a second measurement. The probability that both authentication scores are above 0.7 using the Pearson correlation R-value are shown in the third column. Statistical analysis showed that an array of 4 sensors (3-axis) would produce a passing test result about 0.672% of the time if a second measurement was taken. While the probability of passing a random PUF part are significantly reduced, this places a burden on the user to move the reader and take a second measurement of the magnetic fingerprint. Similarly, mechanical means could be employed to automatically shift the PUF reader sensor array by 1 mm at an added cost.

TABLE 1

| # Sensors | Probability (Pearson Correlation R-Value score >0.7) | Probability (Two Pearson Correlation R-Value scores >0.7) |
| --- | --- | --- |
| 4 | 8.20E−02 | 6.72E−03 |
| 5 | 4.20E−02 | 1.76E−03 |
| 6 | 8.00E−03 | 6.40E−05 |
| 7 | 1.30E−03 | 1.69E−06 |
| 8 | 8.00E−05 | 6.40E−09 |
| 12 | 4.00E−09 | 1.60E−17 |
| 16 | 1.20E−12 | 1.44E−24 |
| 20 | 4.30E−18 | 1.85E−35 |
| 24 | 1.10E−21 | 1.21E−42 |

Given the low cost of magnetic sensor chips, the preferred implementation would be to use a PUF reader with more sensor chips in the reader head to achieve the same confidence level as measured here by the Pearson correlation R-value. It should be noted that if the magnetic sensors do not perform measurements of all three orthogonal axes of the magnetic field, that one would need additional sensor measurements to compensate for the reduced information coming from each sensor.

Referring to FIG. 2, a printer cartridge 201 is shown with PUF material attached on features 211 and 221. This PUF material can be made in various thicknesses from a fixed block to a thin tape. The PUF may be applied onto the surface or molded into the supply item.

A reader device 301 is shown in FIG. 3 with multiple sensors 311a, 311b, and 311c are shown, for example, that come in close proximity to the PUF surfaces. The number of sensor locations, a total of twelve (12) are shown on the reader device in FIG. 3, is determined by the level of security needed for the application that can provide a secure authentication of the printer cartridge, in this instance.

The reader may contain an array of sensors arranged on a flat surface that may be in any pattern. The sensors must be nominally spaced a minimum distance apart to give significantly different field values. A preferred separation would be approximately 1 mm, but this distance is not limiting. The accuracy of each sensors known relative location in the sensor array is necessary as described above. The preferred ratio of the spacing to the particle length is 3.33, but this ratio is not limiting.

The reader in FIG. 3 could be used for both PUFs attached at 211 and 221 in FIG. 2. The reader is not limited to a specific surface, however. The PUF at 221 has three surfaces available for reading (bottom 231, side 241, and top 251). Moreover, the reader could wrap around the three sides as long as their relative positions are known/predetermined from the sensor calibration.

As discussed above, the number of sensors can be reduced if more locations are measured by discrete movements of the sensors. This can be done by adding an actuation system to the reader, whether mechanical or electromechanical, for example.

FIG. 4 shows a reader element that has two sections, 411a and 411b. Each section has an array of sensors, such as, e.g., 431a, 431b, and 431c that can be located adjacent if the sections abut as in FIG. 4 or separated by a fixed distance determined by a connecting element 521 as in FIG. 5, which shows two separated sections, 511a and 511b. Each separated section has an array of sensors, such as, e.g., 531a, 531b, and 531c. The adjacent mode in FIG. 4 has 12 sensor locations. If both sets of sensor faces are allowed to move during the authentication measurement a distance greater than the minimum separation distance from the adjacent mode in FIG. 4 then this adds another 12 sensor locations, thus increasing the security level.

An example embodiment of a reader with two sections is that on a printer for a cartridge with a magnetic PUF that is inserted and removed by the user. A simple mechanical cam or lever action as is known to persons of ordinary skill in the art can push the sections together during the forward motion and apart with reverse motion. Another embodiment would be to use the cover door of a printer to actuate the assembly between adjacent, FIG. 4, and separated, FIG. 5.

Referring to FIG. 6, a PUF reader device 601 that may incorporate the reader elements of FIGS. 3, 4, and 5 is shown. A sensor array 611 is positioned on the bottom of the reader device 601. The sensor array 611 may be potted with epoxy resin or other polymer material to protect it from interference/damage by static electricity, dirt, or other factors. As shown in FIG. 7, by positioning the array on the bottom of the device, it may be placed in close proximity (contact) to a PUF 711. In FIG. 7, the PUF element is a film or tape, that is made by extrusion processes, and is preferably a thickness between is 0.05 mm to 1.50 mm. With a suitable adhesive backing (not shown), a section of PUF tape can be applied to the surface of an element to be identified. However, other PUF elements may be used instead of a tape. Further, the PUF element may be used in conjunction with a local, associated non-volatile memory, wherein the non-volatile memory contains magnetic field profile data measured from the magnetized particles. The magnetic field profile data could also be stored online or in a cloud location for later access. Further, data stored online or in the cloud location may correspond to bar code or QR code data use to the select the associated enrollment data.

The magnetized particles may contain neodymium and iron and boron, or other compounds such as samarium and cobalt, or any other magnetic materials that would produce a measurable magnetic field.

The PUF reader device 601 may have a camera or other viewing element 641, to assist in positioning the device, read a Quick Response ("QR") code or other identification mark, orient the device with respect to fiducials, or otherwise provide an optical orientation of the PUF 711. A viewing display, 701, allows the user to view the image captured by the camera lens. The viewing display, 701, may also be a touchscreen for operation of the PUF reader device 601.

Lighting elements, 621 and 631, such as LED or other appropriate lighting, illuminate the camera image.

The image sensor may be a complementary metal-oxide-semiconductor (CMOS) or a semiconductor charge-coupled device (CCD) or other similar device to measure an image or optical reflectance from the PUF material.

Optionally, a viewing element, lighting, and display can be removed, and physical features such a guide edges (not shown), or other appropriate element, can be used to orient the PUF reader device 601 and the PUF 711.

The PUF reader device, as shown in the exploded views in FIGS. 8 and 9 can be either battery powered 801 or other power supply.

As previously disclosed, a two-dimensional array of magnetic sensors arranged on a printed circuit card is an efficient means to measure a magnetic field over the surface of a PUF part where the PUF is non-rotating relative to the sensor. In order to increase the accuracy of the magnetic field measurement over the surface of a PUF part, it is necessary increase the two-dimensional spatial resolution of the magnetic sensor array to the range of the average magnetic particle diameters (25 µm minimum diameter and 50-500 µm average diameter), which is considerably less than the 2 mm center-center spacing of sensors in the magnetic sensor array previously disclosed.

Magnetic Sensor Description

The preferred magnetic sensor array described in this invention is constructed with multiple 2-axis or 3-axis Hall effect magnetic sensors that are each designed to be sensitive to the magnetic field on more than one axis, but it should be noted that the magnetic sensor array could also be constructed using any magnetic sensor (not necessarily a Hall effect sensor) that is designed to be sensitive to the magnetic field on more than one axis of measurement.

Such a 2-axis magnetic sensor (FIG. 10) or 3-axis magnetic sensor (FIG. 11) that is designed to be sensitive to the magnetic field on 2-axis or 3-axis is to be differentiated from a 1-axis magnetic sensor (FIG. 12) that is designed to only be sensitive to the magnetic field on 1-axis. FIG. 10 shows a first Hall sensor 1001 for the X-direction 1011, and a second Hall sensor 1002 for the Y-direction 1012, designed to be sensitive to the magnetic field on two axes. The electrical leads 1021*a*, 1021*b*, 1021*c*, and 1021*d* are shown for the first Hall sensor 1001 in FIG. 10, are present for all Hall sensors shown herein, but are not shown for each sensor. The electrical leads may be connected at different locations for the Hall sensor than shown to give the particular characteristics desired. FIG. 11 shows a first Hall sensor 1101 for the X-direction 1011, and a second Hall sensor 1102 for the Y-direction 1012, and the added third Hall sensor 1103 for the Z-direction 1013 in order to be sensitive to the magnetic field on three axes. The locations of Hall sensors 1101, 1102 and 1103 are not limited to be in a corner geometry configuration relative to each other. The only requirement is that each Hall sensor be positioned to resolve 3 orthogonal magnetic field values. FIG. 12 shows a 1-axis sensor 1201. The prior art shows that magnetic field measurements made with a 1-axis magnetic sensors can be combined with a software algorithm to estimate the magnetic field strength for the other two-axes, but with less precision and accuracy than measurements made with magnetic sensors that are designed to be sensitive to the magnetic field on two- or three-axes. Such a single axis magnetic sensor would be insufficient for the highest accuracy multi-axis magnetic field measurement or time necessary to compute the other directional components.

However, a magnetic sensor that has been designed to be sensitive to the magnetic field on two-axes may be combined with a software algorithm to estimate the magnetic field of the third-axis with enough accuracy for this application. Finally, a magnetic sensor that has been designed to be sensitive to the magnetic field on all 3-axes can provide the magnetic field measurement on all 3-axes without need of estimation or post calculations. More than one of these multi-axis sensors are arranged in a one-dimensional or two-dimensional array using the following methods.

Discrete Magnetic Sensor Array Description

The first method used to construct a magnetic sensor array with increased two-dimensional spatial resolution combines multiple magnetic sensor die, where each die contains a magnetic sensor that is designed to be sensitive to the magnetic field on more than one axis, where each die is constructed using a semiconductor fabrication process, where each die is sawn out of a wafer individually, and where more than one die are assembled together in an integrated circuit package (such as a multi-chip module (MCM), but not limited to such) to form an integrated circuit device containing multiple magnetic sensors arranged in an array with a spatial resolution less than 1.5 mm, which is an improvement over that disclosed above.

In such a device, multiple die can be arranged on a multi-layer high-density interconnect (HDI) substrate which provides improved placement and increased wiring density that can reduce the spacing between the sensor die to as low as 0.1 mm. The substrate of assembled magnetic sensor dice (more than one die) can then be packaged in an integrated circuit package such as a multi-chip module (MCM) and one or more of these devices can be assembled on a printed circuit card to form a magnetic sensor array with a two-dimensional field of view of arbitrary size and improved two-dimensional spatial resolution of as low as 1.1 mm center to center (with 1 mm/side sensor die). The reduction in center to center spacing of the sensors in the magnetic sensor array enables a higher resolution magnetic field measurement along the surface of a PUF part using a PUF reader such as that disclosed herein.

FIG. 13 provides an illustration of such a magnetic sensor array device which consists of multiple magnetic sensor die that are sawn out of the wafer individually and assembled together in an integrated circuit package. In this example, 16 individual die 1301 are assembled on a multi-layer high-density interconnect (HDI) substrate 1311 in a 4×4 arrangement 1321 and packaged in a multi-chip module (MCM) package that is approximately 5 mm/side (with 1 mm/side die). The substrate 1311 with the assembled sensor chips (die) may also be encapsulated with a covering such as epoxy (not shown in FIG. 13). Solder balls (1531 in FIG. 15) are placed on the bottom of the substrate (side opposite side of the epoxy) and are used to connect the MCM to a printed circuit card 1401. FIG. 13 and FIG. 14 show the top of the MCM package, the bottom would also look like 1521 with the solder balls 1531 (see FIG. 15). The circles in FIGS. 13 and 14 indicate the location of the sensor within the perimeter of each die but are not a separate element. Many other arrangements of individual magnetic sensor die assembled on an HDI substrate are possible (e.g., 1×2, 2×2, 2×3, 3×3, 3×4, 4×5, 5×5, etc.) as well as is the use of other multi-die integrated circuit packages such a System in Package (SIP).

FIG. 14 provides an illustration of one or more of the magnetic sensor array devices assembled on a printed circuit card with nominal spacing of 0.4 mm to increase the size of the array to an arbitrary size. In this example, 16 magnetic sensor array devices 1321 (each containing a 4×4 array of individual die 1301) are assembled on a printed circuit card 1401 in a 4×4 arrangement forming a 16×16 array of magnetic sensor die capable measuring the magnetic field over a 20×20 mm field of view. Another example (not shown) is a combination of 4 devices (each containing a 4×4 array of individual die) assembled on a printed circuit card in a 2×2 arrangement forming an 8×8 array of magnetic sensor die that is capable of measuring the magnetic field over a 10×10 mm field of view. Many other combinations are possible to construct a magnetic sensor array with an arbitrary sized two-dimensional field of view ranging from 1 mm×1 mm to greater than 20 mm×20 mm.

The second method used to construct a magnetic sensor array with increased two-dimensional spatial resolution combines multiple magnetic sensor die, where each die contains a magnetic sensor that is designed to be sensitive to the magnetic field on more than one axis, where each die is constructed using a semiconductor fabrication process, where more than one die are sawn out of a wafer as a unit and where one or more of the units, with each unit containing multiple die, are assembled together in an integrated circuit package (such as a multi-chip module (MCM) or wafer level package (WLP), but not limited to such) to form an integrated circuit device containing multiple magnetic sensors arranged in an array with a spatial resolution less than 1.5 mm which is an improvement over that previously disclosed above.

In such a device, sawing multiple die out of the wafer as a unit and assembling the unit of multiple die as an integrated circuit device reduces the space between the sensor die to as low as 0.1 mm which is the typical distance of the scribe line 1331 and seal line 1341 between each individual die on a semiconductor wafer. A scribe line 1331 is the perimeter area around the seal ring used for dicing (sawing) individual die from the silicon wafer. A seal ring 1341 (shown for die 1301) is a structure fabricated around the die to prevent cracks and contamination from entering the die during dicing.

One or more of these devices can be assembled on a printed circuit card to form a magnetic sensor array with a two-dimensional field of view of arbitrary size and improved two-dimensional spatial resolution as low as 1.1 mm center to center (with 1 mm/side sensor die). The reduction in center-to-center spacing of the sensors in the magnetic sensor array enables a higher resolution magnetic field measurement along the surface of a PUF part using a PUF reader such as that disclosed above.

FIG. 15 provides an illustration of such a magnetic sensor array device which consists of multiple magnetic sensor die that are sawn out of the wafer 1501 as a group and assembled as a unit in an integrated circuit package. In this example, a multiple die unit 1511 of 16 die are sawn out of the wafer as a 4×4 unit and assembled in a flip-chip wafer level package (WLP), that is approximately 5 mm/side (with 1 mm/side die), by placing solder balls 1531 on top of the die unit 1521 and (optionally) encapsulating the bottom of the die unit (not shown) in epoxy. The device is then placed top down and connected to a printed circuit card by melting the solder balls. Many other arrangements of multiple sawn die array sizes assembled into a WLP are possible (e.g., 1×2, 2×2, 2×3, 3×3, 3×4, 4×5, 5×5, etc.) as well as is the use of other integrated circuit packages such as flip chip BGA (FCBGA).

FIG. 16 provides an illustration of one or more of the magnetic sensor array devices assembled on a printed circuit card 1601 with nominal spacing of 0.4 mm to increase the size of the two-dimensional array to an arbitrary size. In this example, 16 magnetic sensor array devices 1611 (each containing a 4×4 array 1612 of multiple sawn die) are assembled on a printed circuit card 1601 into a 4×4 arrangement forming a 16×16 array 1621 of magnetic sensor die capable of measuring the magnetic field over a 20×20 mm field of view. The arrangement is shown with column numbers 1631 and row numbers 1641. Another example (not shown) is a combination of 4 devices (each containing a 4×4 array of multiple sawn die) assembled on a printed circuit card in a 2×2 arrangement forming an 8×8 array of magnetic sensor die that is capable of measuring the magnetic field over a 10×10 mm field of view. Many other combinations are possible to construct a magnetic sensor array with an arbitrary sized two-dimensional field of view that ranges from 1 mm×1 mm) to greater than 20 mm×20 mm.

Discrete Magnetic Sensor Array Measurement Scheme

In an automated system where multiple PUF parts are rapidly moving in succession over a magnetic sensor array device and the unique magnetic field "fingerprint" for each PUF part is recorded and stored for later verification during an authentication process, it is desirable to reduce the magnetic field measurement time of each individual PUF part and also to reduce the time between successive measurements in order to increase the overall measurement throughput. This invention provides a means to improve the throughput of multiple magnetic field measurements made in succession when using a magnetic sensor array device constructed from multiple die such as those shown in FIGS. 13-17.

The method to decrease the measurement time of the magnetic field for a PUF part, using a magnetic sensor array device consisting of multiple die, is to arrange the multiple magnetic sensor die, where each die contains one or more magnetic sensors, in a two-dimensional array organized as multiple rows and multiple columns, where each magnetic sensor die in a row is configured to respond to a different address and where each magnetic sensor die in a column, in whole or in part, is connected to a shared bus (such as by I2C or similar) and controlled and readout by a dedicated bus master device. This enables one or more columns (for example where the number of columns equal 2 to the power of N where N=2, 3, 4, 5, 6, 7, 8), in whole or in part, of magnetic sensor die to be addressed and measured simultaneously by a dedicated bus master connected to one or more columns, in whole or in part, of the magnetic sensor die. Each bus master can then sequence through the addresses of each row of magnetic sensor die independently, while measuring one or more columns, in whole or in part, of magnetic sensor die simultaneously, until all rows in the array have been addressed and all the magnetic sensor die measured. This organization reduces the measurement time of the entire array of magnetic sensor die to just the measurement time of one column, in whole or in part, of magnetic sensor die.

FIG. 17 provides an illustration of such a measurement system with 16 magnetic sensor array devices 1711 (each containing a 4×4 array of magnetic sensor die uniquely addressed) arranged in a 4×4 array forming a two-dimensional magnetic sensor array 1701 organized as 16 rows 1731×16 columns 1721. Each of the 16 columns 1721 are connected to a dedicated bus master (shown as an FPGA or ASIC controller 1741) that uniquely addresses each of the 16 die in a column. This enables each of the 16 bus masters 1751, one per column, to independently sequence through the addresses of each of the 16 rows 1731 in a column so that each of the 16 columns are measured in parallel reducing the measurement time of the entire array to the time it takes to measure one column.

The measurement time could be further decreased by providing a dedicated bus master for a fraction of the magnetic sensor die in one or more columns (for example where the number of columns equal 2 to the power of N where N=2, 3, 4, 5, 6, 7, 8) and measuring the fraction of die (for example where the number of fractions equal 2 to the power of N where N=2, 3, 4, 5, 6, 7, 8) in one or more columns in parallel. For example (not shown), if a dedicated bus master is provided for one-half of the 16 columns (e.g., top half 1735 and bottom half 1736) and the 32 half-columns are measured in a parallel, then the measurement time of the entire array is reduced to the time to measure one-half column. In the limit, if a dedicated bus master is provided for each die in the magnetic sensor array, then each die in the array can be measured in parallel reducing the measurement time of the entire array to the time to measure one die.

The method to decrease the time between successive magnetic field measurements for multiple PUF parts, using a magnetic sensor array device consisting of multiple die, is to overlap the transmission of the measurement data from a first magnetic field measurement, in whole or in part, to a host computer with making a second magnetic field measurement, in whole or in part. The overlap of the measurement process, in whole or in part, with the transfer process, in whole or in part, enables the second measurement to proceed, in whole or in part, before the data for the first measurement is transferred, in whole or in part, increasing the measurement throughput.

The means to accomplish this is by including in the measurement controller (shown in FIG. 17 as a FPGA or ASIC controller 1741) a memory buffer 1761 than can temporarily store the measurement data from the first measurement of the array, in whole or in part, while a second measurement of the array, in whole or in part, is in process. The measurement data from the first measurement is transmitted from the memory buffer to a host computer 1781, in whole or in part, via a host computer interface 1771, e.g., USB, while the second measurement proceeds, in whole or in part. The memory buffer can be appropriately sized so the time to transmit to a host computer closely matches the time to make the measurement. This optimization enables the transmission of the data from the memory buffer to the host computer to complete about the same time as the second measurement completes. At this point, the measurement data from the second measurement is stored in the memory buffer and the third measurement begins concurrently with the second measurement data being transmitted to a host computer. This process continues until all the magnetic field measurements are completed.

Monolithic Magnetic Sensor Array Description

The third method used to construct a magnetic sensor array with increased two-dimensional spatial resolution combines multiple magnetic sensors, where each magnetic sensor is designed to be sensitive to the magnetic field on more than one axis, where more than one sensor is fabricated on the same semiconductor wafer, where the center-to-center spacing between sensors on the wafer is less than the maximum average magnetic particle diameter (500 μm, for example), and where each die is sawn out of the a wafer individually and where one or more die are assembled together in an integrated circuit package (such as a multi-chip module (MCM) or wafer level package (WLP), but not limited to such) to form an integrated circuit device containing multiple magnetic sensors arranged two-dimensional array with spatial resolution less than 500 μm, and in some cases with spatial resolution less than 100 μm, which is a significant improvement over that previously disclosed above.

Because of the miniaturization provided by the semiconductor process technology an arbitrarily large array of multi-axis magnetic sensors (e.g., 192 sensors rows×192 sensors columns=36,864 total multi-axis sensors) can be integrated together with each multi-axis magnetic sensor dimension very small (less than 500 μm×500 μm and in some cases less than 100 μm×100 μm) and spaced very closely together (less than 100 μm). This capability greatly reduces the center to center spacing of the multi-axis magnetic sensors in the array. Reduction of the center to center spacing closer to the range of the magnetic particle diameters (25 μm minimum and 50-500 μm average) enables the highest resolution magnetic field measurement along the surface of a PUF part using a PUF reader such as that disclosed above.

FIG. 18 provides an illustration of the organization of such a magnetic sensor array device 1801 where multiple (2×2 illustrated here but could be any arbitrary size) multi-axis magnetic sensors 1811 (like those shown in FIG. 10 or FIG. 11) are arranged in a two-dimensional array on a common semiconductor substrate (not shown), and powered by a voltage supply 1841. The magnetic sensors along the horizontal rows are accessed with common row select lines 1821 and the magnetic sensors along the vertical columns are connected with common column access lines 1822. Column lines can be unique per sensor axis as shown 1822 or shared by multiple sensor axis that are not shown. FIG. 18 shows unique column lines/sensor axis, but shared column lines for multiple axes is also possible, although not shown in the diagram. Analog multiplexers 1851 connect the analog voltage from the selected sensor to the readout channel that consists of amplification 1861, compensation 1871, and digitization 1881 necessary to convert the magnetic sensor detected analog voltage to a digital output 1891. This organization enables multiple sensors in the array to be read out in parallel by using a multiple readout channels.

FIG. 19 provides an illustration of the features of a monolithic multi-axis magnetic sensor array 1901 (192 rows×192 columns) constructed on a semiconductor substrate 1911 which include the magnetic sensor array 1901, readout channels 1921*a*, 1921*b*, analog voltage generators 1931 and digital control logic 1941. The analog voltage generator provides voltage and current bias for the magnetic sensor array and supporting electronics. The readout channels contain amplification, noise reduction, compensation and digitization necessary to convert the magnetic sensor detected analog voltage to a digital output. The digital control logic directs the magnetic field measurement, readout and transmission of result to a host computer (not shown).

FIG. 20 provides an illustration of the device in FIG. 19 containing an array of 192×192 magnetic sensors and assembled in an integrated circuit package (such as a WLP) that is approximately 20 mm/side and when placed on a printed circuit card 2001 is capable of measuring a magnetic field over approximately a 20 mm×20 mm field of view. Another example (not shown) is a device containing an array of 96×96 magnetic sensors and assembled in an integrated circuit package (such as a WLP) that is approximately 10 mm/side and when placed on a printed circuit card is capable of measuring a magnetic field over approximately a 10 mm×10 mm field of view. Many other sizes of two-dimensional magnetic sensor arrays with equivalent field of views are possible by using semiconductor manufacturing technology to construct a cost effective, high resolution magnetic sensor array device with an arbitrarily sized field of view for measuring the magnetic field over a two-dimensional surface at high speed.

Monolithic Magnetic Sensor Array Measurement Scheme

In an automated system where multiple PUF parts are rapidly moving in succession over a magnetic sensor array device and the unique magnetic field "fingerprint" for each PUF part is recorded and stored for later verification during an authentication process, it is desirable to reduce the magnetic field measurement time of each individual PUF part and also to reduce the time between successive measurements in order to increase the overall measurement throughput. This invention provides a means to improve the throughput of multiple magnetic field measurements made in succession when using a monolithic magnetic sensor array device such as that shown in FIGS. 18-20.

The method to decrease the time of magnetic field measurement in the monolithic magnetic array device, where multiple multi-axis magnetic sensors are arranged in rows and columns, is to measure the magnetic field for more than one sensor in the array at the same time. One or more axes of sensors each located in one or more columns and/or located in one or more rows can be readout at the same time with the use of parallel readout channels. Each magnetic sensor has a finite measurement time so measuring each sensor in the array one a time means the total measurement time is determined by the measurement time per sensor multiplied by the number of sensors. By measuring sensors of one or more axes each located in one or more columns and/or located in one or more rows at the same time, the total measurement time is decreased proportionally to the number of axes measured at the same time multiplied by the number of columns measured at the same time multiplied by the number of rows measured at the same time.

The ability to place parallel structures on a semiconductor device enables the duplication of features necessary to accomplish the simultaneous measurement. This includes not only the magnetic sensors, but also the readout channels necessary to translate the magnetic sensor analog output voltage into a digital value which includes amplification, noise reduction, temperature compensation and analog to digital conversion. This is illustrated in FIG. 18 and FIG. 21 where sensors of one axis in multiple columns in one row are read out in parallel and can be extended to reading out sensors of multiple axes in multiple columns in one row in parallel and can be further extended to reading out sensors of multiple axes in multiple columns in multiple rows in parallel.

In the example in FIG. 21, a monolithic magnetic sensor array device 2102 consisting of a magnetic sensor array 2101 of 192 rows×192 columns of 3 axis sensors 2111, e.g., totals 110,592 sensors. If this device was constructed with only one serial readout channel, then the total measurement time (@10 msec per sensor) would be 1105.9 seconds. If the device was constructed with a parallel readout channel for one axis of each column in a row, then the total measurement time would be reduced by 192 resulting in a total measurement time of 5.8 seconds. Further if the device was constructed with a parallel readout channel for each axis of each column in one row, then the total measurement time would be reduced by 576 (192 multiplied by 3) resulting in a total measurement time of 1.9 seconds. Last if the device was constructed with a parallel readout channel for each axis of each column in four rows, then the total measurement time would be reduced by 2304 (192 multiplied by 3 multiplied by 4) resulting in a total measurement time of 480 milliseconds.

The method to decrease the time between successive magnetic field measurements for multiple PUF parts using a monolithic magnetic sensor array device is to overlap the transmission of the measurement data from a first magnetic field measurement, in whole or in part, to a host computer with making a second magnetic field measurement, in whole or in part. The overlap of the measurement process, in whole or in part, with the transfer process, in whole or in part, enables the second measurement to proceed, in whole or in part, before the data for the first measurement is transferred, in whole or in part, increasing the measurement throughput.

The means to accomplish this is provided by including in the magnetic sensor array device a memory buffer than can temporarily store the measurement data from the first measurement, in whole or in part, while a second measurement is in process, in whole or in part. The measurement data from the first measurement is transmitted from the memory buffer to a host computer, in whole or in part, while the second measurement is in process, in whole or in part. The memory buffer can be appropriately sized so the time to transmit to a host computer closely matches the time to make the measurement. This optimization enables the transmission of the data from the memory buffer to the host computer to complete about the same time as the second measurement completes. At this point, the measurement data from the second measurement is stored in the memory buffer and the third measurement begins concurrently with the second measurement data being transmitted to a host computer. This process continues until all the magnetic field measurements are completed.

FIG. 21 provides an illustration of this process. In this example, a magnetic sensor array device 2102 consisting of a 192×192 array 2101 of magnetic sensors 2111 and a digital controller measurement and readout device 2191 measures the magnetic field over the surface of the first PUF part (PUF part not show, see FIG. 22) and the result is stored in an on-chip memory (SRAM) 2121 from which is it subsequently sent to a host computer 2141 via a high speed digital interface 2131 (e.g., I2C or SPI). The readout channels contain amplification with noise cancellation and compensation 2151, a 16-bit analog to digital controller (one per column) 2161, a 192×16 column capture register 2171, and a column multiplexor (192×16 to 1×16) 2181. The second PUF part is then measured and stored in the on-chip memory at the same time as the measured value from the first PUF part is transferred to the host computer. The on-chip memory is appropriately sized to optimize the throughput improvement increase. The sizes of each part of the magnetic sensor array device 2102 are merely illustrative and other dimensions and organizations could be used.

Sensing Distance Improvements

The methods previously described provide a means of constructing a magnetic sensor array that is capable of a higher spatial resolution in the X-dimension and Y-dimension over the surface of a PUF part. A further benefit of this invention is the capability to reduce the Z-dimension sensing distance, which is distance from the sensor array to the surface of the PUF part. The benefit of reducing this sensing distance is that it has the effect of amplifying the magnetic field signal that is being sensed because the magnetic field strength is reduced inversely by the cube of the distance to the sensor. This is important for the low amplitude magnetic field signals that are expected to be produced by magnetized particles with sizes at the lower end of the expected range (25 µm minimum diameter and 50-500 µm average diameter).

The method to reduce the distance of the magnetic sensor array from the surface of the PUF part generating the magnetic field is to construct an integrated circuit with a magnetic sensor array built into the substrate of the semiconductor wafer to a depth of approximately 10 μm. A semiconductor wafer is typically 750 μm thick after processing, but it is common to thin the wafer by "back-grind" (to a thickness as low as 50 μm) before the wafer is sawn into individual die and the individual die are assembled into an integrated circuit package. A wafer constructed with a magnetic sensor array that is back-ground after processing and is assembled into an integrated package, such as a wafer level package (but not limited to such), can result in a distance from the magnetic sensor array to the PUF part to be less than 200 μm.

FIG. 22 provides an illustration of the construction process to reduce the distance of the magnetic sensor array using the method just described. FIG. 22A illustrates a magnetic sensor array constructed in a semiconductor wafer 2201a before the wafer is thinned. The X and Y axis sensors are formed in the deep N-type implant 2221 diffused through 2211 into the P-type bulk silicon substrate 2231 and 2241 and the Z axis sensors are formed in the shallow N-type implant 2211 only diffused in the P-type bulk silicon substrate 2231 and 2241. The dashed line between 2231 and 2241 indicated the dividing line in the P-type bulk silicon substrate where the grinding process will be used to remove section 2241. The sensor construction is merely illustrative as there are many ways to construct magnetic sensors using materials and structures provided by semiconductor technology. FIG. 22B illustrates the same magnetic sensor array after the wafer 2201b has been thinned using the back-grinding process. The thinning of the bulk silicon substrate with back grinding reduces the distance from all the sensors in the array to the bottom of the silicon wafer where the PUF is located for sensing. After the wafer has been back-ground, the semiconductor wafer is sawn into individual magnetic sensor array die and each magnetic sensor array die (shown as 2 by 2 magnetic sensor array) is packaged in an encapsulant 2293 resulting in an integrated circuit package 2200 as shown in FIG. 22C. If the die is packaged in a flip chip package such as a wafer level package, all axes of the magnetic sensor will be very close (much less than 500 μm typical of a non-flip chip package) to the surface of the integrated circuit package. The result is that the sensing distance from all axis of the magnetic sensor to the PUF part 2291, generating the magnetic fields 2292 shown from the left particle 2290, will be minimized which will have the effect of amplifying the magnetic field signal generated by the very small particles embedded in the PUF part 2291. The upward arrows in FIG. 22C indicate that the PUF part 2291 containing particle 2290 and other particles are moved until 2291 contacts the sensor encapsulant 2293 or another protectant layer if desired before being read. The field lines shown 2292 and others are representative of the field lines of particle 2290. Other particles will have their own field lines and the sensor array 2200 will sense the superposition of all the magnetic fields at each Hall sensor surface.

Movement Error Improvements

A further benefit of this invention is a means to minimize the impact that any movement during a measurement of the sensor array relative to the PUF part has on the measurement result. In a PUF reader system, where the PUF part and the magnetic sensor array device are stationary relative to each other, the impact of movement on the measurement is for the most part eliminated. This means the magnetic field measurement over a two-dimensional array of magnetic sensors can proceed sequentially (over a period of time) beginning with the first row of sensors and proceeding row by row (or by groups of rows) until reaching the last row of sensors without any movement-induced measurement error.

However, if during a measurement process such as this, there was any movement of the magnetic sensor array relative to the PUF part, it could distort the measurement result in a number of ways, such as repeat measurement of a portion of the PUF part or inaccurate measurement due to change in the distance of the magnetic sensor array to PUF part. This could make measuring the magnetic field across the surface of a PUF part problematic for a portable or handheld reader device which does not enforce precise three-dimensional alignment between the PUF part and the reader device and where unintended motion could create a measurement error.

The method to minimize any error in the magnetic field measurement caused by movement of the magnetic sensor array relative to the PUF part is to include a sample and hold circuit for each magnetic sensor in the array. The sample and hold circuit enables multiple sensors in the array to be measured at approximately the same time and the measurement result to be temporarily stored for each sensor so any impact on movement is minimized. The control circuit integrated in the magnetic sensor array device provides a trigger signal to cause multiple sensors in the array to initiate a measurement and transfer the result into a temporary storage location within the magnetic sensor (such the voltage stored in a capacitor). As a result of storing the magnetic field measurement value for multiple magnetic sensors that are measured at the same time, the impact of any magnetic field measurement error due to movement is minimized.

FIG. 23 provides an illustration of a sample and hold circuit that is integrated into each axis of a magnetic sensor and is replicated for each magnetic sensor in the two-dimensional array. Multi-axis magnetic sensors 1101, 1102, and 1103 (like those shown in FIG. 10 or FIG. 11) are powered by a voltage supply 2321 and ground 2301. The magnetic sensors are accessed with common row select line 2311 and along the vertical column access lines 2331a, 2332a, 2333a, 2331b, 2332b, and 2333b. The sample and hold circuit 2341 provides a temporary storage of the voltage associated with magnetic field measurement of each axis of the magnetic sensor until analog multiplexers 2351a, 2351b connect the voltage stored in the sample and hold circuit 2341 to the readout channel (amplification, compensation, digitization) 2361 and transferred to an on-chip memory and then subsequently to host computer (not shown).

Temperature Measurement Improvements

A further benefit of this invention includes a means to more accurately compensate for the effect that temperature has on distorting the magnetic field measurement made with a magnetic sensor array device. Most magnetic sensors constructed using semiconductor technology (such as Hall effect technology or magneto-resistive technology) must compensate for the non-linear effect that temperature has on the magnetic field measurement produced by the sensor. These sensors typically integrate both a magnetic sensor and a temperature sensor (also referred to as a thermal diode) alongside each other on the same semiconductor die in order to measure both the magnetic field and temperature simultaneously. The temperature measurement can then be used (either by hardware integrated into the sensor device or by software run on a host computer) to compensate for any error in the magnetic field measurement made by the magnetic sensor using an algorithm with parameters that are determined by the characterized performance of the magnetic sensor across the variation in manufacturing process, operating voltage and operating temperature of the device.

In a semiconductor device, it is normal for the temperature to vary across the area of the semiconductor die due to the variation in circuit activity (e.g., transistor switching) from one location to another. This variation in circuitry activity causes some locations on the die to be at an elevated temperature where there is higher circuit activity and some locations on the die to be at a lower temperature where there is lower circuit activity. In a device with a single magnetic sensor and a single temperature sensor, the two sensors can be closely spaced alongside each other so there is almost no variation in the temperature caused by a difference in circuitry activity at the two sensor locations. This means that the temperature at the temperature sensor location is an accurate representation of the temperature at the magnetic sensor location, however this is not the case for a magnetic sensor array device that uses a single temperature sensor since the distance will vary from each magnetic sensor in the array to the single temperature sensor it could result in an error in the temperature measurement due to a variation in circuit activity at the respective locations.

The method to avoid the temperature measurement error in a device with a large magnetic sensor array is to integrate into the device multiple temperature sensors that reduce the distance from each magnetic sensor to its respective temperature sensor. Ideally there would be one temperature sensor for each magnetic sensor in the array, however, this could have an adverse impact on the size of the semiconductor die and unduly increase cost. An alternative is to arrange the magnetic sensors in the array into sections where each section contains an equal number of magnetic sensors both horizontally and vertically as well as one temperature sensor placed at the corner of each section.

This arrangement reduces the distance and temperature variation from each magnetic sensor in the array to its associated temperature sensor and produces a more accurate temperature measurement that can be used by the hardware or software to compensate the magnetic field measurement for temperature. The temperature for each magnetic sensor can be calculated by any suitable algorithm such as averaging the temperature measurement from the four temperature sensors in the corner of its section or by simply using the temperature measurement from the closest temperature sensor.

FIG. 24A provides an illustration of this by dividing the magnetic sensor array into four sections 2401*a, b, c,* and *d* with two sections arranged horizontally and two sections arranged vertically with a temperature sensor 2411 placed at the corner of each section for a total of nine temperature sensors for the entire array. This concept can be extended, as illustrated in FIG. 24B, by dividing the magnetic sensor array into 16 sections with four sections arranged horizontally, 2421*a, b, c,* and *d* in the first row, for example, and four sections arranged vertically with a temperature sensor 2411 placed at the corner of each section for a total of 25 temperature sensors for the entire array. This division of the array into sections with a temperature sensor placed at the corner of each section can continue as far as required to eliminate any temperature measurement error due to a difference in circuit activity at the location of the magnetic sensor versus the location of the temperature sensor.

Yield Loss Improvements

A further benefit of this invention is the method disclosed here to minimize the impact of yield loss on the cost of the magnetic sensor array device. It is normal for a semiconductor wafer manufacturing process to exhibit yield loss that is a proportional to the characterized defect density per unit area of the process. These defects result from imperfections in the materials and contamination from particles such as dust that pass through the filtering systems that provide the clean room environment necessary for the creating the very small structures found in semiconductor devices. The cost of the semiconductor device is proportional to the area of the device and the manufacturing yield, so it is desirable to reduce the size of the device and to increase the manufacturing yield in order to lower the cost. For small magnetic sensor array devices, the expected yield loss is minimal, but when the magnetic sensor array size becomes larger (for example where the number of sensors/row are 2 to the power of N where N=2, 3, 4, 5, 6, 7, 8 and the number of sensors/column are 2 to the power of N where N=2, 3, 4, 5, 6, 7, 8), the benefit of a method to minimize the impact of sensor defects on yield loss is very important to minimize device cost.

A semiconductor device that integrates a very dense regular structure (like a memory device which uses an array of memory cells) is more sensitive to the yield loss due to defects during wafer fabrication process. To compensate for the prohibitive yield loss amplified by very dense regular structures, these devices typically implement redundant structures alongside some of the required regular structures. When the semiconductor wafer is tested, if a regular structure (like a memory cell) is determined to be defective, the test program can store some parameters in the device (e.g., in electronic fuses) that instruct the device to permanently substitute the functional redundant structure for the defective regular structure.

The substitution of these redundant structures for any defective structures enables the devices that would otherwise have been discarded to now be functional, which increases yield and lowers cost. The magnetic sensor array device also integrates a very dense regular structure in the form of the magnetic sensor cells which are combined into a very dense two-dimensional array over an arbitrarily large surface area of the wafer so they are also subject to prohibitive yield loss and a way must be found to minimize this impact. In a memory device, there is no dependency on the location of the redundant structure relative to the location of the defective regular structure that it is replacing, but this is not the case for a magnetic sensor array device used to measure the magnetic field over a two-dimensional area so an alternate means must be devised to minimize the impact of yield loss on the cost of the device.

The method to make the cost of the magnetic sensor array device less susceptible to the expected yield loss is to create a map of non-functional magnetic sensors that is stored in the device or in an external memory at the time of manufacture. The map of non-functional sensors is then used by the magnetic sensor array device (or by a software algorithm) during the time of magnetic field measurement to substitute the magnetic field measurement for the non-functional sensors with an interpolated result from the adjacent functional sensors using an interpolation algorithm such as averaging or any similar algorithm. Alternatively, the map of non-functional sensors could instruct the verification algorithm to discard the magnetic field measurement from that portion of the magnetic sensor array that is non-functional and not use it as part of the verification algorithm.

The semiconductor wafer is tested prior to the sawing the wafer into individual die in a test process commonly referred to as "wafer probe." This test is a means to identify good die and bad die before the good die are sawn from the wafer and assembled into an integrated circuit package while the bad die is discarded. By integrating into the magnetic sensor array device, a non-volatile memory (such as an EEPROM), it is possible to store in the device at the time of the wafer probe test the locations of the non-functional sensors for later use by the magnetic field reader device or verification algorithm. Similarly, at the time of "wafer probe" test, it is possible to store the map of non-functional sensors outside of the device in an external database (or external memory) where they could later be accessed by a software algorithm to make the measurement compensations for non-functional sensors that were previously described.

By characterizing the tolerance that the PUF verification algorithm has across all the possible defective sensor locations, a pass/fail criterion (such as no more than 5% non-functional sensors in the device that are located no closer than every other sensor location) can be established and used by the wafer probe test to allow a fraction of magnetic sensor array devices to be considered functional even though they contain some number of non-functional sensors. This provides a means to lower the cost of the magnetic sensor array device without appreciably affecting the magnetic field measurements on the verification of genuine and non-genuine PUF parts.

FIG. 25 provides an illustration of a fraction of non-functional magnetic sensors 2501a-m distributed over a magnetic sensor array. In this example, there are 12 non-functional sensors and 244 functional sensors 2511, e.g., in a 16×16 array of 256 sensors. The pass/fail criteria used for this example was non-functional sensors located no more than one row or one column apart shown by the region 2521, e.g., for non-functional sensor 2501a and a total yield loss of no more than 5%. By utilizing this criterion this magnetic sensor device could be considered functional instead of non-functional and the semiconductor process yield is increased, and the cost of each magnetic sensor array device is reduced. A potential measurement interpolation algorithm is also illustrated here where the measurement for each non-functional sensor is substituted with the average by the 8 nearest functional sensors 2531a-h, e.g., shown in the surrounding box 2521, e.g.

We claim:

1. A method to construct a magnetic sensor array device with increased two-dimensional spatial resolution comprising:
   combining multiple magnetic sensor die, where each die contains a magnetic sensor that is designed to be sensitive to the magnetic field on more than one axis;
   constructing each die using a semiconductor fabrication process;
   sawing more than one die out of a wafer as a unit; and
   assembling one or more of the units, with each unit containing multiple die, in an integrated circuit package to form an integrated circuit device containing multiple magnetic sensors arranged in an array with a spatial resolution less than 1.5 mm.

2. The method of claim 1, wherein the device measures a magnetic field over a period of time.

3. The method of claim 2, wherein the period of time of a magnetic field measurement in the device is decreased by:
   using multiple magnetic sensors that are each designed to be sensitive to the magnetic field on more than one axis; and
   using multiple multi-axis magnetic sensors arranged in rows and columns to measure the magnetic field for one or more axes of one or more columns of sensors in one or more rows simultaneously.

4. The method of claim 3, wherein an algorithm is used to estimate the magnetic field of a third axis.

5. The method of claim 3, further wherein a dedicated bus master is provided for a fraction of the magnetic sensor die in one or more columns and measuring the fraction of magnetic sensor die in one or more columns in parallel.

6. The method of claim 2, wherein the time of the magnetic field measurement in the device is decreased by:
   using multiple three-axis magnetic sensors that are each designed to be sensitive to the magnetic field on more than one axis; and
   a magnetic sensor array with multi-axis magnetic field measurement, where multiple multi-axis magnetic sensors are arranged in rows and columns to measure the magnetic field for one or more axes of one or more columns of sensors in one or more rows simultaneously.

7. The method of claim 1, wherein the device measures a magnetic field of a physical unclonable function part.

8. The method of claim 7, wherein the magnetic field is measured over a period of time.

9. The method of claim 8, wherein more than one magnetic field measurement is taken successively.

10. The method of claim 9, further wherein the time between successive magnetic field measurements for multiple physical unclonable function parts using a magnetic sensor array device consisting of multiple die is decreased, the method comprising:
    overlapping the transmission of the measurement data from a first magnetic field measurement, in whole or in part, to a host computer with making a second magnetic field measurement, in whole or in part, where the overlap of the measurement process, in whole or in part, with the transfer process, in whole or in part, enables the second measurement to proceed, in whole or in part, before the data for the first measurement is transferred, in whole or in part, increasing the measurement throughput.

11. The method of claim 1, further wherein the distance of the magnetic sensor array from a surface of a PUF part generating a magnetic field is reduced by back-grinding the wafer.

12. The method of claim 1, further wherein the error in a magnetic field measurement caused by movement of the magnetic sensor array device relative to a PUF part is minimized comprising:
    including a sample and hold circuit for each magnetic sensor in the array device, where the sample and hold circuit enables multiple sensors in the array device to be measured at approximately the same time and the measurement result to be temporarily stored for each sensor so any impact on movement is minimized;
    integrating the control circuit in the magnetic sensor array device to provide a trigger signal to cause multiple sensors in the array device to initiate a measurement; and
    transferring the result into a temporary storage location within the magnetic sensor.

13. The method of claim 1, further wherein steps to avoid a temperature measurement error in a magnetic sensor array device are taken comprising:
    integrating into the device multiple temperature sensors that reduce the distance from each magnetic sensor to its respective temperature sensor, where there is one temperature sensor for each magnetic sensor in the array; and measuring a temperature and magnetic field.

14. The method of claim 1, further wherein the sensor array device is made less susceptible to expected yield loss by steps comprising:
   creating a map of non-functional magnetic sensors that is stored either in the device or outside the device at the time of manufacture; and
   using the map of non-functional sensors by the magnetic sensor array device during the time of magnetic field measurement.

15. The method of claim 14, further comprising:
   substituting the magnetic field measurement for the non-functional sensors with an interpolated result from the adjacent functional sensors using an interpolation algorithm such as averaging or any similar algorithm.

16. The method of claim 14, further comprising:
   running an algorithm using the map of non-functional sensors during the time of magnetic field measurement; and
   instructing the algorithm to discard the magnetic field measurement from that portion of the magnetic sensor array that is non-functional.

17. A method to decrease the time of magnetic field measurement in a monolithic magnetic array device comprising:
   using multiple 2-axis hall effect magnetic sensors that are each designed to be sensitive to the magnetic field on more than one axis;
   using a magnetic sensor array with multi-axis magnetic field measurement; and
   using a software algorithm to estimate the magnetic field of the third-axis with sufficient accuracy,
   where multiple multi-axis magnetic sensors are arranged in rows and columns to measure the magnetic field for one or more axes of each one or more columns of sensors in one or more rows simultaneously, further wherein a dedicated bus master is provided for a fraction of the magnetic sensor die in each one or more columns and measuring the fraction of die in each column in parallel.

18. A method to decrease the time of magnetic field measurement in a monolithic magnetic array device, where multiple multi-axis magnetic sensors are arranged in rows and columns comprising:
   measuring the magnetic field for more than one sensor in an array at the same time; and
   reading out one or more axes of sensors each located in one or more columns and/or located in one or more rows at the same time with parallel readout channels, wherein by measuring sensors of one or more axes each located in one or more columns and/or located in one or more rows at the same time, the total measurement time is decreased proportionally to the number of axes measured at the same time multiplied by the number of columns measured at the same time multiplied by the number of rows measured at the same time.

* * * * *